(12) United States Patent
Lepird et al.

(10) Patent No.: US 11,328,713 B1
(45) Date of Patent: May 10, 2022

(54) ON-DEVICE CONTEXTUAL UNDERSTANDING

(71) Applicant: Amazon Technologies, Inc., Seattle, WA (US)

(72) Inventors: John Russell Lepird, Pittsburgh, PA (US); Fabian Andreas Bumberger, Toronto (CA); Benjamin Charles Eagan, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 16/876,958

(22) Filed: May 18, 2020

(51) Int. Cl.
| | |
|---|---|
| *G10L 15/22* | (2006.01) |
| *G10L 15/26* | (2006.01) |
| *G10L 15/187* | (2013.01) |
| *G10L 15/193* | (2013.01) |
| *G10L 15/02* | (2006.01) |
| *G06F 40/295* | (2020.01) |

(52) U.S. Cl.
CPC .......... *G10L 15/187* (2013.01); *G06F 40/295* (2020.01); *G10L 15/02* (2013.01); *G10L 15/193* (2013.01); *G10L 2015/025* (2013.01)

(58) Field of Classification Search
CPC .......... G06F 17/30; G06F 17/24; G06K 9/00; G06K 9/20; G10L 15/22; G10L 15/26
See application file for complete search history.

(56) References Cited

U.S. PATENT DOCUMENTS

| | | | | |
|---|---|---|---|---|
| 2017/0185670 | A1* | 6/2017 | Dua | G06F 16/5866 |
| 2020/0097718 | A1* | 3/2020 | Schafer | G06K 9/6256 |

* cited by examiner

*Primary Examiner* — Shreyans A Patel
(74) *Attorney, Agent, or Firm* — Pierce Atwood LLP

(57) ABSTRACT

Techniques for performing spoken language understanding (SLU) processing locally on a user device are described. When a user device is about to present content on a display, the user device may generate one or more SLU models (e.g., one or more ASR models and/or one or more NLU models) specific to the content to be presented. When the user device receives a spoken input while the content is being presented on the display, the user device performs SLU processing on the spoken input using the display-specific SLU model(s).

20 Claims, 12 Drawing Sheets

FIG. 1A
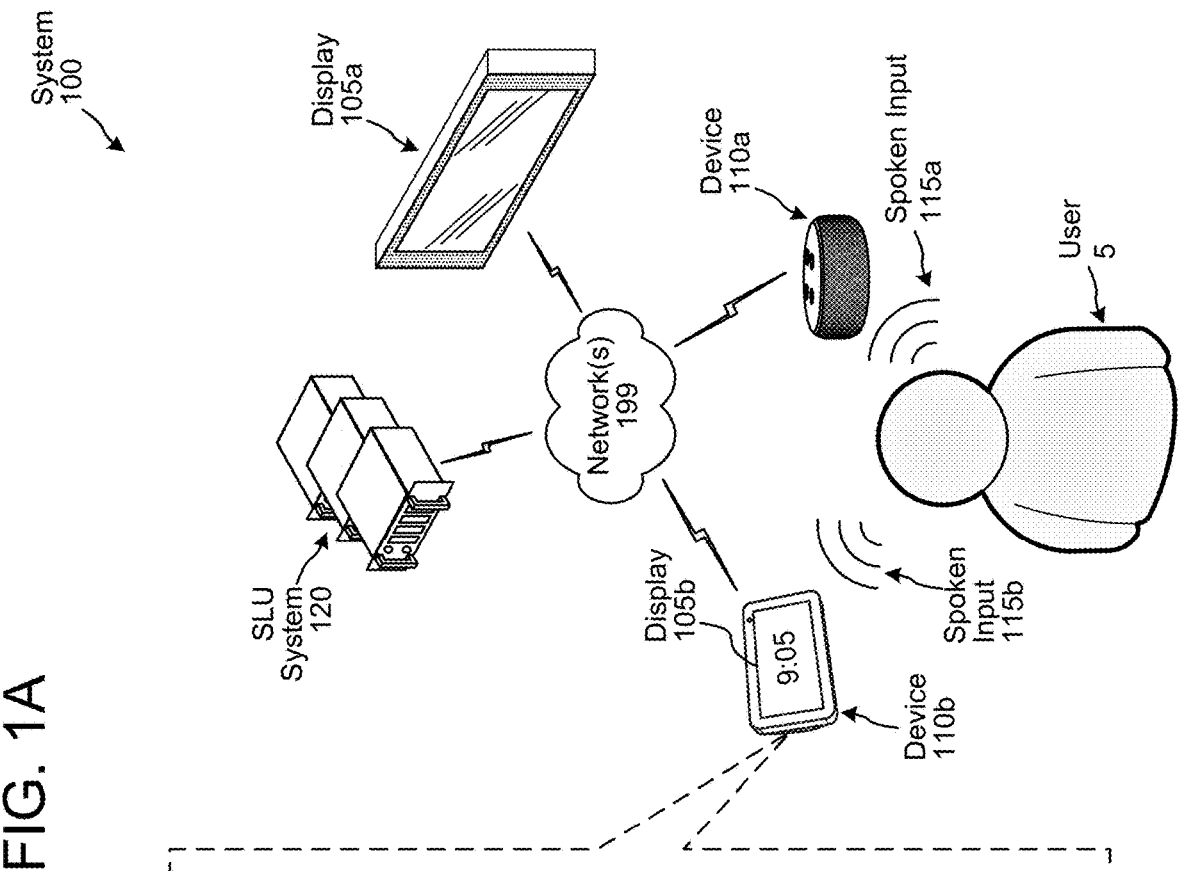
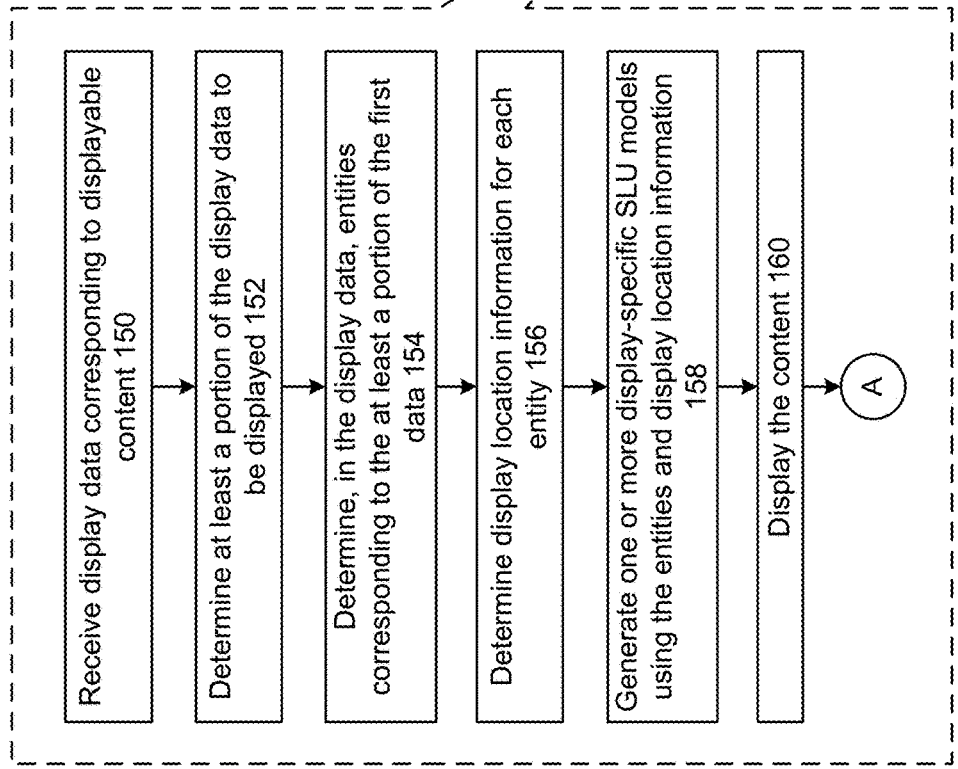

US 11,328,713 B1

ON-DEVICE CONTEXTUAL UNDERSTANDING

BACKGROUND

Natural language processing systems have progressed to the point where humans can interact with computing devices using their voices and natural language textual input. Such systems employ techniques to identify the words spoken and written by a human user based on the various qualities of a received input data. Speech recognition combined with natural language understanding processing techniques enable speech-based user control of computing devices to perform tasks based on the user's spoken inputs. Speech recognition and natural language understanding processing techniques may be referred to collectively or separately herein as natural language processing. Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are a conceptual diagram illustrating a system configured to update device-stored spoken language understanding (SLU) modeling based on displayed content, and process spoken inputs locally on the device using the updated SLU modelling, according to embodiments of the present disclosure.

DETAILED DESCRIPTION

Figure 1B:
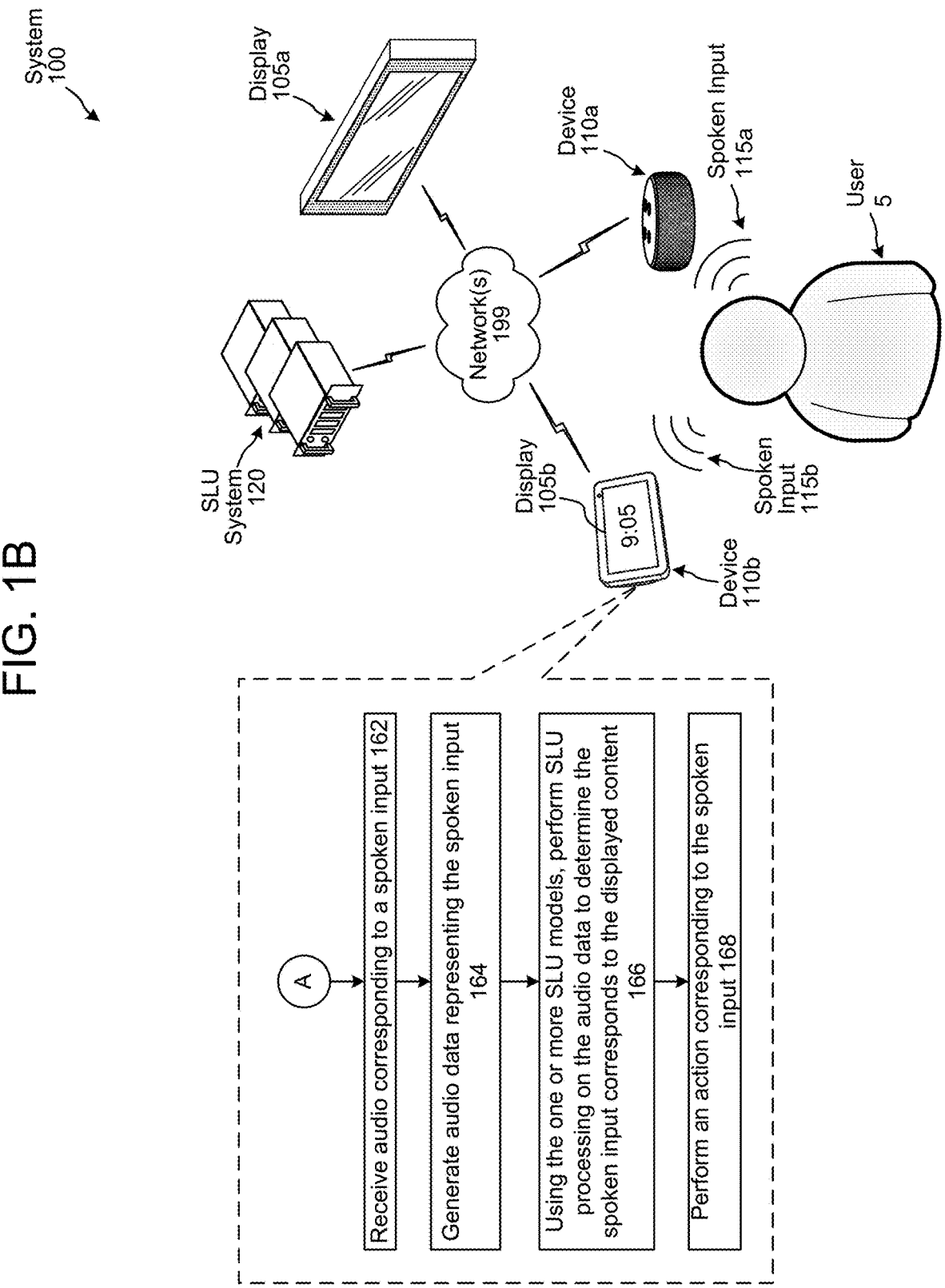

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs. ASR and NLU are often used together as part of a speech processing system, also called a spoken language understanding (SLU) system. Text-to-speech (TTS) is a field of computer science concerning transforming textual and/or other data into audio data that is synthesized to resemble human speech.

In general, a system may cause actions to be performed in response to natural language inputs (e.g., spoken inputs and/or typed inputs). For example, for the natural language input "play Adele music," a system may output music sung by an artist named Adele. For further example, for the natural language input "turn on the lights," a system may turn on "smart" lights associated with a user's profile. In another example, for the natural language input "what is the weather," a system may output weather information for a geographic location corresponding to the device that captured the natural language input. In the foregoing examples, actions correspond to the outputting of music, turning on of "smart" lights, and outputting of weather information. As such, as used herein, an "action" may refer to some result of a system's processing.

The present disclosure provides techniques for increasing a number of spoken inputs that can be processed by a user device using its own components. At least some embodiments disclosed herein use display context information to update language processing modeling (e.g., ASR modeling and/or NLU modeling), resulting in an improved ability of a user device to process and understand a spoken user command that references items on the display, and/or other operational/contextual information related to the device.

A user may provide a spoken input requesting the display of content. A device may generate audio data representing the spoken input, and send the audio data to a remote system for SLU processing. The remote system may identify a catalog of information corresponding to the requested content, as well as display content for the requested content. Thereafter, the remote system may send the catalog and display content to the user device.

The user device may use the received information and display content to render a display corresponding to a response to the spoken input. For example, the user device may render a display representing movie choices, which may include only a portion of the movie choices represented in the received catalog.

The user device may generate display-specific SLU models using information corresponding to the rendered display. For example, the user device may store one or more NLU exact match rule templates that include entities and display location information as variables. The user device may populate the one or more NLU exact match rule templates with entity and display location information corresponding to the rendered display, resulting in one or more display-specific NLU exact match rules. When the user device receives a spoken input while the display is rendered, the user device may use the one or more NLU exact match rules to interpret the spoken input.

The teachings herein enable device-localized processing of spoken inputs that relate to particular screen elements (e.g., such as "play number three," "selecting continue watching," "play Harry Potter," "play this," "get more information on the last one," etc.). Such effectively allows SLU processing (and the performance of associated actions)

for certain spoken inputs (e.g., relating to presently displayed content, regardless of the specific content being displayed) to be handled by a user device.

As an example, a user device may display images corresponding to videos, corresponding movie titles, etc. in response to a spoken input to display top-rated movies. Prior to the user device displaying the images and corresponding other information, the user device may generate SLU models (e.g., NLU exact match rules) specific to the to-be displayed information, and their future locations on the display. The user device may use such SLU models to understand spoken inputs indicating relative display locations, such as "select the third movie", "play the leftmost movie", etc.

As another example, a user may be playing a game and a user device may display multiple choice answers, in which one of the answers is "what is the weather". Prior to the user device displaying the multiple choice answers, the user device may generate SLU models (e.g., NLU exact match rules) specific to the multiple choice answers, and their future locations on the display. While the user device is displaying the multiple choice answers, the user device may receive a spoken input including "what is the weather". Without implementing the foregoing NLU exact match rules, the user device may interpret the spoken input to request the output of weather information corresponding to a geographic location of the user device. However, by implementing the NLU exact match rules, the user device may correctly interpret the spoken input to refer to the displayed multiple choice answer.

Systems leveraging the teachings herein may provide a more desirable user experience as performing SLU processing of a spoken input locally, on a user device, may require less than that is needed to invoke a remote system to perform SLU processing of the spoken input.

In at least some embodiments, a user device may only send a spoken input to a remote system, for SLU processing, if the user device is unable to process the spoken input. Such has the added benefit of increased privacy as such configuration decreases the amount of user speech that needs to be sent to the remote system for processing.

A system according to the present disclosure may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A-1B show a system 100 configured to update SLU modeling based on displayed content, and process spoken inputs locally on the user device using the updated SLU modeling. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include a device 110*a*/110*b*, a display 105*a* separate from but in communication with (e.g., via wireless local area network (WLAN) data transmissions) the device 110*a*/110*b*, a display 105*b* integrated within the device 110*b*, and a SLU system 120 connected across one or more networks 199. While the user 5 is illustrated as being a human, other types of users (e.g., computing systems) may exist. Additionally, while FIGS. 1A-1B illustrate processing steps performed by the device 110*b*, it will be appreciated that the processing steps may instead be performed by the device 110*a* without departing from the present disclosure.

The device 110 may receive (150) display data corresponding to displayable items. In at least some embodiments, the device 110 may be configured to render displayable items. As such, the display data may be, for example, a JavaScript Object Notation (JSON) file representing items capable of being displayed, such as images and text. In an example, the display data may be a JSON file including movie poster images, with each movie poster image being associated with entities such as a movie title, one or more movie title synonyms, one or more cast names, a release year, one or more nearby movie theater names playing the movie, playing times for the movie at the movie theaters, etc.). For further example, the display data may be a JSON file including answers to a trivia question. As another example, the display data may be a JSON file including music album cover images, which each image being associated with entities such as an album name, one or more song names, an artist name, an album release year, etc. In each of the foregoing examples, the display data may not instruct the device 110 on how to render the display data. It will be appreciated that the device 110 may receive the aforementioned display data from various sources.

In at least some embodiments, the device 110 may receive the display data from the SLU system 120. For example, the device 110 may send, to the SLU system 120, audio data representing a spoken input. The SLU system 120 may process the audio data to determine the spoken input requests content be displayed. In response, the SLU system 120 may generate the display data, corresponding to the requested content, and may send the display data to the device 110.

In at least some embodiments, the device 110 may receive the display data from an on-device component (such as a skill component or an application). For example, the device 110 may send, to the on-device component, SLU output data representing a spoken input. The on-device skill component may process the SLU output data to determine the spoken input requests content be displayed. In response, the on-device component may generate the display data. The on-device component may generate the display data using data provided from various sources, such as skill systems, websites, and other displayable content sources in communication with (but not implemented by) the device 110.

The device 110 may determine (152) at least a portion of the display data to be rendered on the display 105 (e.g., as images, text, virtual buttons, and/or other displayable content, such as text). For example, the device 110 may determine the at least a portion of the display data based on a size of the display 105, a resolution of the display 105, user preferences (e.g., the user 5 wants to be presented with at most 5 movie poster images at once), etc. In embodiments where the display data is a JSON file, the device 110 may determine at least a portion of the items, in the JSON file, to be rendered on the display 105.

Once the device 110 determines the at least a portion of the display data to be rendered on the display 105, the device 110 may determine (154), in the display data, entities corresponding to the at least a portion of the display data to be rendered. For example, if the device 110 determines three movies (e.g., each corresponding to a movie poster image and corresponding entities in a JSON file), the device 110 may determine, in the JSON file, entities that are associated with the three movies. For further example, if the device 110 determines three virtual buttons with inset text are to be rendered (with each of the virtual buttons corresponding to a different item in a JSON file), the device 110 may determine, in the JSON file, entities corresponding to the three virtual buttons (e.g., may determine entities corresponding to text to be inset into the virtual buttons on a display 105). In at least some embodiments, the entities may correspond to entities recognized using named entity recognition (NER) processing at runtime (as described herein below).

The device 110 may determine (156) display location information for each of the determined entities. For example, the device 110 may determine display location information (e.g., rightmost, middle, leftmost, top, bottom, first, second, third, etc.) for each item to be displayed (e.g., each a movie poster image, each virtual button, each album cover image, etc.) and may associate the display location information with each entity (e.g., movie title, actor name, actress name, year of release, inset button text, etc.) corresponding to the displayable item.

The device 110 may generate (158) one or more display-specific SLU models (e.g., one or more acoustic models and/or one or more language models (for ASR processing), one or more NLU exact match rules, etc.) using the entities and display location information. In at least some embodiments, the device 110 may generate NLU exact match rules by populating one or more exact match rule templates using the entities and display location information as variables.

For example, in the situation where the display data is a JSON file representing videos and associated entities, the device 110 may generate NLU exact match rules from a template corresponding to a "Play" NLU intent and/or a template corresponding to a "Select" NLU intent. For example, the "Play" template may be represented as "play <videoname> <videoposterimagedisplaylocation>". The "Select" template may be represented as "select <videoname> <videoposterimagedisplaylocation>". In the foregoing, <videoname> corresponds to a video name entity, and <videoposterimagedisplaylocation> corresponds to display location information corresponding to the entity (e.g., corresponding to the displayed item with respect to which the entity is associated).

For example, in the situation where the display data is a JSON file generated in response to the spoken input "show me the top-grossing movies of 2019", the device 110 may populate the foregoing NLU exact match rule templates to generate NLU exact match rules corresponding to "play <avengersendgame> <leftimage>", "play <thelionking> <middleimage>", "play <frozentwo> <rightimage>", "play <avengersendgame> <firstimage>", "play <thelionking> <secondimage>", "play <frozentwo> <thirdimage>", "select <avengers endgame> <leftimage>", "select <thelionking> <middleimage>", "select <frozentwo> <rightimage>", "select <avengersendgame> <firstimage>", "select <thelionking> <secondimage>", "select <frozentwo> <thirdimage>", and/or one or more other NLU exact match rules.

For further example, in the situation where the display data is a JSON file representing software applications and associated entities, the device 110 may generate NLU exact match rules from a template corresponding to a "Launch" NLU intent. For example, the "Launch" template may be represented as "launch <applicationname> <applicationiconimagedisplaylocation>". In the foregoing, <applicationname> corresponds to an application name entity, and <applicationiconimagedisplaylocation> corresponds to display location information corresponding to the entity (e.g., corresponding to the displayed application icon with respect to which the entity is associated).

Thus, in the situation wherein the display data is a JSON file generated in response to the spoken input "show me the top mobile apps of 2019", the device may populate the foregoing NLU exact match rule template to generate NLU exact match rules corresponding to "launch <FacebookMessenger> <leftimage>", "launch <Facebook> <middleimage>", and "launch <WhatsAppMessenger> <rightimage>".

After the SLU model(s) has been generated, the device 110 may display (160) the items (e.g., movie poster images, virtual buttons, application icons, music album covers, etc.) corresponding to the entities used to generate the SLU model(s). Display of the items may include the device 110 causing the items to be displayed on a display integrated within the device 110 (e.g., such as the display 105*b* of the device 110*b*). Display of the items may additionally or alternatively include the device 110 causing the items to be displayed on a display separate from but in communication with the device 110 (e.g., such as the display 105*a* with respect to the device 110*a*/110*b*).

While the items are being displayed on the display 105, the device 110 may receive (162) a spoken input 115 from the user 5. The device 110 may generate (164) audio data representing the spoken input, and may, using the one or more display-specific SLU models generated above, perform (166) SLU processing on the audio data to determine the spoken input 115 corresponds to the displayed content. Thereafter, the device 110 may perform (170) an action corresponding to the spoken input. For example, if the display 105 is displaying images corresponding to various movies, and the spoken input 115 corresponds to "play the left most movie," the device 110 may cause video data, corresponding to the leftmost displayed image, to be output. For further example, if the display 105 is displaying images corresponding to various movies, and the spoken input 115 corresponds to "show me more information about the third movie," the device 110 may cause bibliographic information, corresponding to the third displayed image, to be output. In another example, if the display 105 is displaying images corresponding to a subset of the movies represented in the display data, and the spoken input 115 corresponds to "show me more movies," the device 110 may determine another portion of the display data corresponding to different movie poster images, and may cause these further images to be displayed. In this example, prior to causing the further images to be displayed, the device 110 may generate one or more SLU models for the to-be displayed further images (as described above with respect to items received in the display data). This enables the device 110 to perform display-specific SLU processing, with respect to the newly displayed content, should the device 110 receive a subsequent spoken input referring to the newly displayed content. In at least some embodiments, performing the action may include sending, to a skill system 125 (described in further detail herein) or skill component (implemented by the device 110 or the SLU system 120), an indication of the entity associated with the spoken input 115, and the skill system/component can then perform some action (e.g., processing) based thereon. Other examples are possible.

In at least some embodiments, the device 110 may send the audio data, representing the spoken input, to the SLU system 120, and the SLU system 120 may perform SLU processing at least partially in parallel to the device 110 perform SLU processing on the spoken input. Sometime after the device 110 sends the audio data to the SLU system 120 (which, due to latency, may be sometime after the device 110 performs the action corresponding to the spoken input 115), the device 110 may receive response data from the SLU system 120. In the example of FIG. 1B, where the device 110 determines the spoken input corresponds to the displayed content, the device 110 may determine not to process with respect to the response data. In other words, the device 110 does not need to use the response data to perform the action since the display-specific SLU model enabled the device 110 to determine the action independently. Conversely to FIG. 1B, if the device 110 was unable to determine, using the one or more display-specific SLU models, that the spoken input corresponds to the displayed content, the device 110, in this situation, may process with respect to the response data to perform an action responsive to the spoken input 115.

In at least some embodiments, the system 100 may be configured with a cloud-based SLU system (e.g., the SLU system 120) as well as another SLU system (not illustrated) that may be separate from but on the same local area network (LAN) as the device 110. In such embodiments, the device 110 may send the audio data to the SLU system 120 and the SLU system located on the same LAN as the device 110. The SLU system, on the same LAN as the device 110, may perform the same (or a subset of) the functionality described herein with respect to the SLU system 120. For example, the SLU system 120, the device 110, and the SLU system (on the same LAN as the device 110) may each, in or substantially in parallel, perform SLU processing as described herein, and one or both of the SLU systems may provide the device 110 with response data.

While the description herein describes processing performed in response to spoken inputs, it will be appreciated that the processing described herein may be performed in response to non-spoken natural language inputs (e.g., typed or other text-based natural language inputs). In such examples, when the device 110 receives a non-spoken natural language input, the device 110, the SLU system 120, and/or a SLU system, on the same LAN as the device 110, may not perform ASR processing with respect to such an input. That is, NLU processing may be performed on the text data corresponding to the typed natural language input.

Processing performed herein (e.g., the generation of one or more SLU models) may, in at least some embodiments, be performed in response to display content changing without a user requesting such. For example, the device 110 may receive (e.g., in response to a spoken or non-spoken natural language input) multimedia data (e.g., a combination of video data and audio data) corresponding to a movie that the user 5 requested be played. The device 110 may receive the multimedia data from an application, a skill component, a SLU system, or another source for multimedia data.

In at least some embodiments, the device 110 may output the multimedia data as the multimedia data is received by the device 110 (e.g., as the device 110 receives a continuous stream of the multimedia data). In at least some other embodiments, the device 110 may receive an entirety of the multimedia data before the device 110 outputs the multimedia data (e.g., the user 5 may cause the device 110 to download the multimedia data for later output in response to a subsequent user input [which may be a natural language input, or non-natural language input such as the selection of a virtual button)].

While the device 110 is outputting the multimedia data, the device 110 may generate display-specific SLU models based on a changing display of entities (e.g., based on actors and/or actresses being and no longer being shown on the display 105). For example, the device 110 may receive entity data associated with the multimedia data, with the entity data representing, for each actor or actress (individually corresponding to a different entity for purposes of SLU processing), one or more portions of the multimedia data where the actor or actress appears "on scene" (e.g., is shown on the display 105). The device 110 may generate a display-specific SLU model(s) each time an actor or actress is about to be newly shown on the display 105. The device 110 may also generate a display-specific SLU model(s) each time an actor or actress is no longer shown on the display 105. In at least some embodiments, each time the device 110 generates a new SLU model(s) corresponding to one or more entities, the device 110 may send data, representing the entities to one or more SLU systems (such as the SLU system 120, or a SLU system located on a same LAN as the device 110). The foregoing processing may enable, while the device 110 is outputting the multimedia data, the device 110 (and optionally a SLU system) to recognize natural language inputs referring to one or more entities presently being shown on the display 105.

Figure 2:
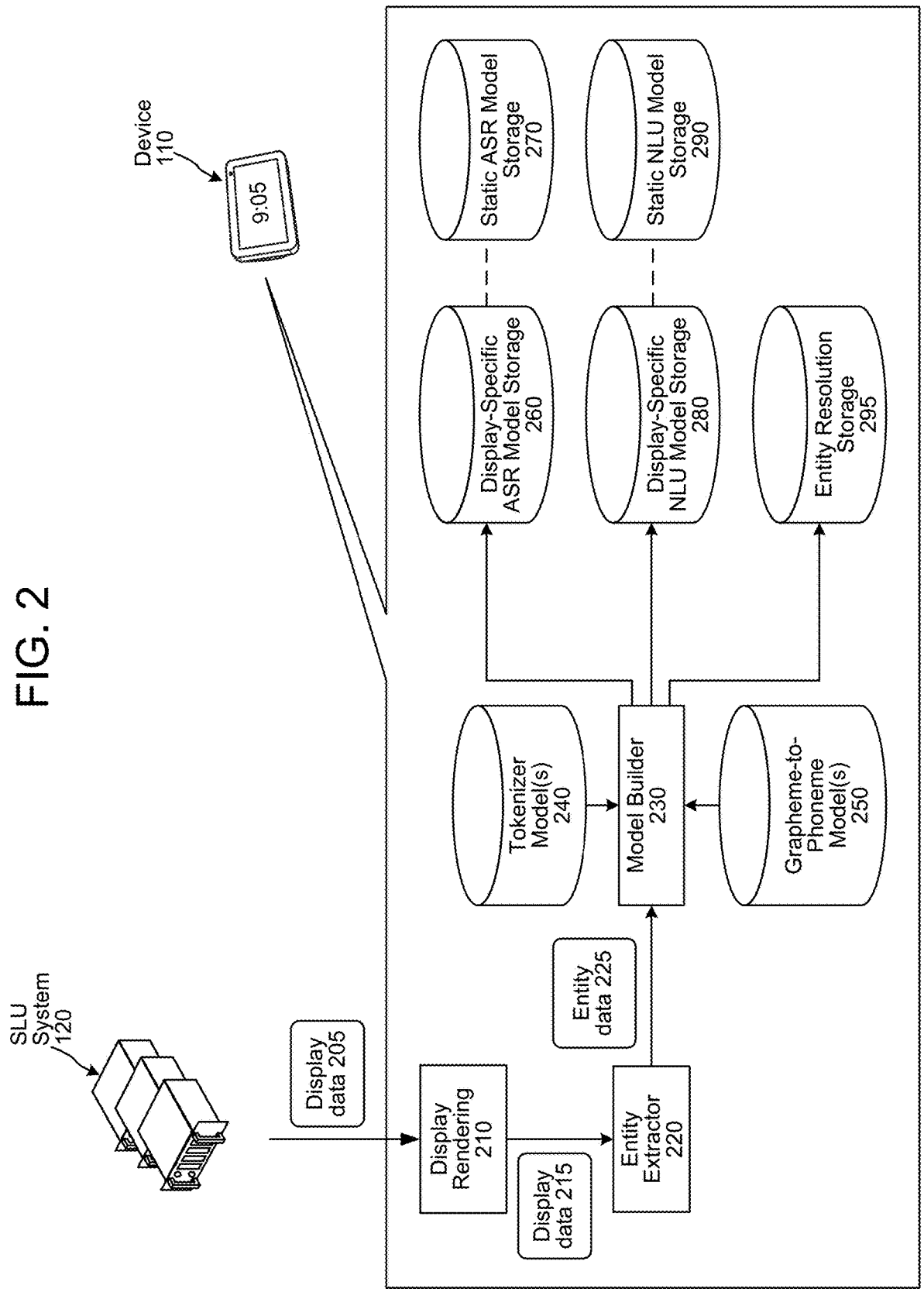
FIG. 2 is a conceptual diagram of components of a device for configuring/building SLU models based on content to be rendered on a display, according to embodiments of the present disclosure.

As discussed above, the device 110 may generate/update a SLU model based on content to be rendered on a display. FIG. 2 illustrates an example device 110 architecture for building such SLU models. As used herein, a SLU model may refer to an ASR model (namely an acoustic model or language model), a named entity recognition (NER) model, an intent classification (IC) model, a language model (comprising a NER model and an IC model), a NLU exact match rule, a finite state transducer (FST), or other data for use in runtime SLU processing. As illustrated in FIG. 2, the process for building a SLU model, based on content to be rendered on a display, may, in at least some embodiments, begin in response to the SLU system 120 sending display data 205 to the device 110. For example, the device 110 may receive a spoken input to display some content. Such spoken input may be in the form of a search request, such as "show me top rated comedies," "what are the best action movies of this month," "show me my preferred movies" (as represented in a profile storage 470 associated with the SLU system 120), "show me my favorite songs" (as represented in the profile storage 470), etc. The device 110 may not have such content stored on the device 110. As described herein, when the device 110 receives a spoken input, the device 110 may send audio data (representing the spoken input) to the SLU system 120 for processing, as well as perform local SLU processing. In the situation where the device 110's SLU processing is unsuccessful (e.g., when the device 110 is not already storing the requested content), the device 110 may receive the display data 205 from the SLU system 120, which represents the requested content. For example, the display data 205 may be a JSON file representing items and associated entities (such as movie poster images associated movie titles, cast names, etc.; music album cover images and associated album cover names, song names, release years, etc.; application icon images and associated application names, developer names, etc.).

In at least some embodiments, the device 110 may receive the display data 205 from a source other than the SLU system 120, such as a SLU system located on a same LAN as the device 110, a storage located on the device 110, a storage in communication with a skill component implemented by the device 110, etc.

Alternatively, the process for building such a display-specific SLU model may begin in response to the device 110 receiving a spoken input to display different items already stored by the device 110. For example, after the device 110 receives the display data 205 and renders a display therefrom, the device 110 may receive a spoken input to display a different portion of the items represented in the display data 205 (e.g., represented in the JSON file). Receipt of such a spoken input may commence processing to build a display-specific SLU model.

Upon the device 110 receiving the display data 205, or upon the device 110 receiving a spoken input to display a different portion of content already stored by the device 110, the display data 205 (or indicator representing display content is to be changed) may be sent to a display rendering component 210 of the device 110.

The display rendering component 210 may determine which content, represented in the display data 205, should be presented on a display (e.g., which items in a received JSON file should be displayed). The display rendering component 210 may make such a determination in view of characteristics of the display 105 to be used to present the content to the user. For example, if the display 105 is of a size such that a maximum of 5 images (e.g., each corresponding to a different movie poster, application icon image, etc.) may be presented to a user at a time, and the display data 205 represents more than 5 items (each corresponding to a different displayable image), the display rendering component 210 may determine the first 5 images, in a list of images in the display data 205 (e.g., in a list of items in a JSON file), should be presented. In the example where the display 105 is presenting images (e.g., corresponding to different movie posters, application icon images, etc.) when the device 110 receives a spoken input to display different content, the display rendering component 210 may determine a next 5 images, in the list of images in the display data 205 (e.g., in a list of items in a JSON file), should be presented. In the example where the display 105 is presenting images (e.g., corresponding to different movie posters) when the device 110 receives a spoken input to select one of the movies, the display rendering component 210 may determine that the selected movie, and associated bibliographic information such as cast, release data, rating, etc., are to be presented on the display 105.

The display rendering component 210 may generate display data 215 specific to the content (e.g., specific to a portion of the items in a JSON file) to be presented on the display 105. In the example where the display data 205 is a JSON file including n items (each corresponding to one or more entities), the display data 215 may be a second JSON file including a portion of the items represented in the JSON file received from the SLU system 120. Each item in this second JSON file may corresponding to one or more entities, and display location information representing a location on the display 105 where an image (corresponding to the item) will be presented. For example, the display data 215 may include, for a given movie, NER entities such as the movie title and names of the cast, and may indicate where, on the display 105, a movie poster image (corresponding to the given movie) will be displayed. Such position information may corresponding to, for example, position 1, position 2, etc.; leftmost image, rightmost image, top left image bottom image, etc. It will be appreciated that the display data 215 may include one or more NER entities, and position information, for each item (e.g., movie poster image) to be rendered on the display 105.

The display rendering component 210 may send the display data 215 to an entity extractor 220 of the device 110. As illustrated, the entity extractor 220 may be implemented as a standalone component of the device 110. However, it will be appreciated that the entity extractor 220 may be implemented as a sub-component of a component of the device 110. For example, the entity extractor 220 may be implemented as part of the display rendering component 210, as part of a software application executed by the device 110, as part of a skill component executed by the device 110, etc.

The entity extractor 220 may parse the display data 215 for entities and associated display location information represented in the display data 215. For example, if the display data 215 is a JSON file including an item corresponding to a movie, the entity extractor 220 may parse the JSON file for entities corresponding to the movie (e.g., movie name, cast name(s), release year, etc.), as well as display location information corresponding to the movie. For further example, if the display data 215 is a JSON file including an item corresponding to a software application, the entity extractor 220 may parse the JSON file for entities corresponding to the movie (e.g., application name, developer name, release date, etc.), as well as display location information corresponding to the application. Other examples are possible.

The entity extractor 220 may generate entity data 225 representing entities and corresponding display location information. For example, if the display data 215 is a JSON file including items corresponding to movies, the entity extractor 220 may generate entity data 225 including, for each separate movie, one or more entities associated with display location information. For further example, if the display data 215 is a JSON file including items corresponding to software applications, the entity extractor 220 may generate entity data 225 including, for each separate application, one or more entities associated with display location information. The entity extractor 220 may send the entity data 225 to a model builder component 230 of the device 110.

As described herein, when the device 110 receives a spoken input, the device 110 may perform SLU processing locally on audio data representing the spoken input, as well as send the audio data to the SLU system 120 for SLU processing. The spoken input may be received by the device 110 while the display 105 is presenting content represented in the display data 215. Accordingly, the display data 215 may be sent to both the model builder component 230 and the SLU system 120. Such enables the model builder component 230 to generate one or more display-specific SLU models to enhance local SLU processing of the spoken input, while also enabling the SLU system 120 to use the display data 215 as context for SLU processing of the spoken input, thereby potentially enhancing the SLU system 120's SLU processing of the spoken input as well.

In at least some embodiments, a display-specific SLU model may be generated once the device 110 determines the display content is going to be presented on the display 105. In at least some embodiments, this may result in the display-specific SLU model being generated and implemented prior to the display content actually being presented on the display 105.

The model builder component 230 may use the display data 215 to generate one or more display-specific ASR models and/or one or more display-specific NLU models. In at least some situations, the display data 215 may include text that does not conform to how ASR processing will output a representation of a spoken input. The model builder component 230 may use one or more tokenizer models 240 to alter text, in the display data 215, to standardize the text with how the text would be output by ASR processing. In at least some embodiments, the one or more tokenizer models

240 may be implemented by a light slot filler component 752, of a NLU component 360, at runtime.

For example, the model builder component 230 may implement a tokenizer model to perform text string manipulations. In at least some embodiments, such a tokenizer model may be code-based. Application of such a model may, for example, manipulate all lettering in the display data 215 to lowercase lettering. Moreover, for example, such a model may convert numbering (e.g., 2010; 1st) to corresponding lettering (e.g., two thousand ten; first). Such a model may also remove punctuation marks from the text in the display data 215, for example (in conjunction with the foregoing text manipulations) changing "2001: A Space Odyssey" to "two thousand one a space odyssey". One skilled in the art will appreciate that various manipulations may be performed using tokenizer models, and that the present disclosure is not limited to the two aforementioned types of text manipulations.

In at least some embodiments, the model builder component 230 may implement a tokenizer model to expand entities in the display data 215 to various interpretations of the entities, such as different textual representations of the entities and synonyms of the entities. In at least some embodiments, such a tokenizer model may be implemented as a finite state transducer (FST) or a deep neural network (DNN). For example, the text "AC" could be expanded to "air conditioning" and/or the synonym "cooling system".

The model builder component 230 may generate a NLU model using the tokenized text in the display data 215. In at least some embodiments, the model builder component 230 may construct the NLU model using exact match rules. At runtime, if a NLU component 360 determines ASR output data, fed into to the NLU component 360, exactly matches the exact match rule (e.g., the intent and entities corresponding to the exact match rule), the NLU component 360 is configured to resolve the spoken input to the exact match rule. In other words, an exact match rule enables the NLU component 360 to identify when a spoken input corresponds to specific content presented on the display 105. In at least some embodiments, the model builder component 230 may generate a single NLU model representing multiple exact match rules corresponding to the entities in the display data 215.

The model builder component 230, in at least some embodiments, may construct an exact match rule from a template including one or more entity variables. The model builder component 230 may use different templates, with each template corresponding to a different NLU intent.

For example, in the situation where the display data 215 corresponds to video content to be presented, the model builder component 230 may construct one or more exact match rules from a template corresponding to a "Play" NLU intent and/or a template corresponding to a "Select" NLU intent. For example, the "Play" template may be represented as "play <videoname> <videoimagedisplaylocation>", with <videoname> and <videoimagedisplaylocation> corresponding to different NER entities represented in the display data 215. For further example, the "Select" template may be represented as "select <videoname> <videoimagedisplaylocation>", with <videoname> and <videoimagedisplaylocation> corresponding to different NER entities represented in the display data 215. One skilled in the art will appreciate that the model builder component 230 is not limited to generating NLU exact match rules for the "Play" and "Select" intents, but rather or also may generate NLU exact match rules for NLU intents such as "Expand" (e.g., to display more information about a displayed entity), "Collapse" (e.g., to stop displaying information about a displayed entity), "Launch" (e.g., to perform the equivalent of a double click with respect to a displayed entity), "Focus" (e.g., to highlight displayed content corresponding to an entity), etc.

As another example, the display data 215 may correspond to music album cover images. For example, the display data 215, for each music album cover image, may include NER entities such as a song name, an artist name, an album name, and location information corresponding to where on the display 105 the music album cover image (and optionally text corresponding to one or more NER entities) will be presented. In this situation, the model builder component 230 may construct one or more exact match rules from a template corresponding to a "Play" NLU intent and/or a template corresponding to a "Select" NLU intent. For example, the "Play" template may be represented as "play <songname> <albumname> <artistname> <albumcoverimagedisplaylocation>", with <songname>, <albumname>, and <artistname> corresponding to different NER entities represented in the display data 215. For further example, the "Select" template may be represented as "select <songname> <albumname> <artistname> <albumcoverimagedisplaylocation>", with <songname>, <albumname>, and <artistname> corresponding to different NER entities represented in the display data 215.

As another example, the display data 215 may correspond to images corresponding to "how to" instructions (e.g., multiple images corresponding to different ways to bake a cake, multiple images corresponding to different ways to build a deck, multiple images corresponding to different ways to change a car's oil, etc.). For example, the display data 215, for each image, may include a named entity recognition (NER) entity such as a source of the how to instructions, and location information corresponding to where on the display 105 the image (and optionally text corresponding to the associated NER entity) will be presented. In this situation, the model builder component 230 may construct one or more exact match rules from a template corresponding to a "Select" NLU intent. For example, the "Select" template may be represented as "select <howtoinstructionsourcename> <imagedisplaylocation>", with <howtoinstructionsourcename> corresponding to a NER entity represented in the display data 215.

It will be appreciated that the foregoing NLU exact rule templates are merely illustrative, and that the model builder component 230 may be configured to access NLU exact match rule templates for various kinds of content to be presented on the display 105. It will further be appreciated, based on the foregoing, that the model builder component 230 may have access to NLU exact match rule templates corresponding to different domains. An illustrative list of domains includes a smart home domain, a music domain, a video domain, a flash briefing domain, a shopping domain, and a custom domain.

The model builder component 230 may populate one or more NLU exact match rule templates using data contained in the display data 215. For example, in the situation where the display data 205 corresponds to content responsive to the spoken input "show me the top-grossing movies of 2019", the model builder component 230 may populate exact match rule templates to generate NLU exact match rules corresponding to "play <avengersendgame> <leftimage>", "play <thelionking> <middleimage>", "play <frozentwo> <rightimage>", "select <avengers endgame> <leftimage>", "select <thelionking> <middleimage>", and "select <frozentwo> <rightimage>". The NLU exact match rules, generated for a single instance of display data 215, may be collectively referred to herein as a "display-specific NLU model."

As another example, the display data 205 may correspond to content responsive to the spoken input "what were the top pop songs of 2019". In such a case, the model builder component 230 may populate exact match rule templates to generate NLU exact match rules corresponding to "play <dontstartnow> <dualipa> <topimage>", "play <motivation> <normani> <middleimage>", "play <graveyard> <halsey> <bottomimage>", "select <dontstartnow> <dualipa> <topimage>", "select <motivation> <normani> <middleimage>", and "select <graveyard> <halsey> <bottomimage>".

For further example, the display data 205 may correspond to content responsive to the spoken input "how do you make a chocolate cake". In such a case, the model builder component 230 may populate exact match rule templates to generate NLU exact match rules corresponding to "play <foodnetwork> <leftimage>", "play <cafedelites> <rightimage>", "select <foodnetwork> <leftimage>", and "select <cafedelites> <rightimage>".

In at least some embodiments, a display-specific NLU model, output by the model builder component 230, may include, in addition to or instead of NLU exact match rules, one or more finite state transducers (FSTs) with slots personalized to the NER entities represented in the display data 215. For example, a display-specific NLU model may include a different FST for each NLU intent represented in the display-specific NLU model. For each FST, the starting node may correspond to a NLU intent and each node, branching from the starting node, may correspond to one or more NER entities corresponding to a different image to be presented on the display 105.

For example, when the display data 205 corresponds to content responsive to the spoken input "show me the top-grossing movies of 2019", the model builder component 230 may generate a FST for the "Play" NLU intent and a separate FST for the "Select" NLU intent. In the "Play" FST, the starting node may correspond to the "Play" NLU intent, a first node branching from the starting node may correspond to "avengersendgame" and "leftimage", a second node branching from the starting node may correspond to "thelionking" and "middleimage", and a third node branching from the starting node may correspond to "frozentwo" and "rightimage". In the "Select" FST, the starting node may correspond to the "Select" NLU intent, a first node branching from the starting node may correspond to "avengersendgame" and "leftimage", a second node branching from the starting node may correspond to "thelionking" and "middleimage", and a third node branching from the starting node may correspond to "frozentwo" and "rightimage". The FSTs, generated for a single instance of display data 215, may be collectively referred to herein as a "display-specific NLU model." Moreover, the NLU exact match rules and FSTS, generated for a single instance of display data 215, may be collectively referred to herein as a "display-specific NLU model."

As another example, when the display data 205 corresponds to content responsive to the spoken input "what were the top pop songs of 2019", the model builder component 230 may generate a FST for the "Play" NLU intent and a separate FST for the "Select" NLU intent. In the "Play" FST, the starting node may correspond to the "Play" NLU intent; a first node branching from the starting node may correspond to "dontstartnow", "dualipa", and "topimage"; a second node branching from the starting node may correspond to "motivation", "normani", and "middleimage"; and a third node branching from the starting node may correspond to "graveyard", "halsey", and "bottomimage". In the "Select" FST, the starting node may correspond to the "Select" NLU intent; a first node branching from the starting node may correspond to "dontstartnow", "dualipa", and "topimage"; a second node branching from the starting node may correspond to "motivation", "normani", and "middleimage"; and a third node branching from the starting node may correspond to "graveyard", "halsey", and "bottomimage".

For further example, when the display data 205 corresponds to content responsive to the spoken input "how do you make a chocolate cake", the model builder component 230 may generate a FST for the "Play" NLU intent and a separate FST for the "Select" NLU intent. In the "Play" FST, the starting node may correspond to the "Play" NLU intent, a first node branching from the starting node may correspond to "foodnetwork" and "leftimage", and a second node branching from the starting node may correspond to "cafedelites" and "rightimage". In the "Select" FST, the starting node may correspond to the "Select" NLU intent, a first node branching from the starting node may correspond to "foodnetwork" and "leftimage", and a second node branching from the starting node may correspond to "cafedelites" and "rightimage".

The model builder component 230 may send the display-specific NLU model to a display-specific NLU model storage 280. If the device 110 is associated with a single display 105, and the display-specific NLU model storage 280 includes a display-specific NLU model corresponding to content previously presented on the display 105, the model builder component 230 may cause the display-specific NLU model (corresponding to the previously presented content) to be deleted from the display-specific NLU model storage 280. Such may ensure that the only display-specific NLU model, in the display-specific NLU model storage 280, corresponds to content being presented on the display 105 when a spoken input is received.

The foregoing NLU exact match rules and/or FSTs, generated by the model builder component 230, may be used at runtime by a NER component 662, IC component XD64, and/or a ranker component 790 (or other component) of a NLU component 360.

If the device 110 is associated with a multiple displays 105, the display-specific NLU model storage 280 may include a display-specific NLU model for each display 105 associated with the device 110. With respect to each display, as described above, the model builder component 230 may delete and store display-specific NLU models such that only one display-specific NLU model is associated with a given display 105 in the storage at a time. As such, a display-specific NLU model, in the display-specific NLU model storage 280, may be associated with a unique identifier (e.g., a serial number, display name, etc.) corresponding to the display 105 to which the display-specific NLU model corresponds.

A display-specific NLU model may be used, at runtime, in conjunction with a static NLU model stored by the device 110 (e.g., in static NLU model storage 290). A static NLU model may include one or more exact match rules corresponding to spoken inputs not specific to what is currently being presented on a display 105. In other words, a static NLU model may not be changed based on the specific content that is being presented on a display 105. For example, a static NLU model may correspond to spoken inputs to increase a volume of output audio, decrease a volume of output audio, pause the output of audio, pause the playing of video content, etc. One skilled in the art will appreciate that these foregoing spoken inputs are merely illustrative, and that various other non-display-specific spoken inputs may be represented a static NLU model of the present disclosure. Such static NLU models may be used at runtime by a NER component 662, IC component XD64, and/or a ranker component 790 (or other component) of a NLU component 360.

A named entity recognition (NER) entity (determined using NER processing as described herein below) may correspond to a specific entity identifier (determining using entity resolution processing as described herein). For example, the NER entity "avengersendgame" may correspond to a first entity identifier used by a video streaming service (implemented by or in communication with the SLU system 120) to identify multimedia data corresponding to the movie titled "Avengers: Endgame", the NER entity "thelionking" may correspond to a second entity identifier used by a video streaming service (implemented by or in communication with the SLU system 120) to identify multimedia data corresponding to the movie titled "The Lion King", the NER entity "frozentwo" may correspond to a third entity identifier used by a video streaming service (implemented by or in communication with the SLU system 120) to identify multimedia data corresponding to the movie titled "Frozen II", the NER entity "dontstartnow" may correspond to a fourth entity identifier used by a music streaming service (implemented by or in communication with the SLU system 120) to identify audio data corresponding to the song titled "Don't Start Now", the NER entity "motivation" may correspond to a fifth entity identifier used by a music streaming service (implemented by or in communication with the SLU system 120) to identify audio data corresponding to the song titled "Motivation", the NER entity "graveyard" may correspond to a sixth entity identifier used by a music streaming service (implemented by or in communication with the SLU system 120) to identify audio data corresponding to the song titled "Graveyard", the NER entity "foodnetwork" may correspond to a seventh entity identifier (e.g., a uniform resource locator (URL)) used by an internet search service (implemented by or in communication with the SLU system 120) to identify data corresponding to the a search result provided by a Food Network website, the NER entity "cafedelites" may correspond to an eighth entity identifier (e.g., a URL) used by an internet search service (implemented by or in communication with the SLU system 120) to identify data corresponding to the a search result provided by a Café Delites website, etc.

The model builder component 230 may generate data associating NER entities with corresponding entity resolution identifiers. The model builder component 230 may send this generated data for storage in an entity resolution storage 295. In at least some embodiments, the entity resolution storage 295 may be configured to store corresponding to NER entities (and associated entity identifiers, for entities represented in the static NLU models of the static NLU model storage 290 and entities corresponding to content presently being displayed on a display 105. As such, entities and corresponding entity identifiers, corresponding to previously but no longer displayed entities, may be deleted from the entity resolution storage 295. The data, stored in the entity resolution storage 295, may be used at runtime by an entity resolution component 770 of a NLU component 360 of the device 110.

In at least some embodiments, the model builder component 230 may not generate a display-specific ASR model when the model builder component 230 receives the display data 215. In such embodiments, at runtime, the device 110 may rely on static ASR models stored in a static ASR model storage 270.

In at least some embodiments, the model builder component 230 may generate a display-specific ASR model when the model builder component 230 receives the display data 215. For example, the model builder component 230 may use the display data 215 to generate a display-specific acoustic model (representing sounds corresponding to words in the display data 215) and/or a display-specific language model (corresponding to word relationships in the display data 215). In at least some embodiments, a display-specific ASR model may include one or more FSTs.

For example, when the display data 205 corresponds to content responsive to the spoken input "show me the top-grossing movies of 2019", the model builder component 230 may generate an ASR FST including a node corresponding to "avengersendgame", a node corresponding to "thelionking", and a node corresponding to "frozentwo. For further example, when the display data 205 corresponds to content responsive to the spoken input "what were the top pop songs of 2019", the model builder component 230 may generate an ASR FST including a node corresponding to "dontstartnow", a node corresponding to "dualipa", a node corresponding to "motivation", a node corresponding to "normani", a node corresponding to "graveyard", and a node corresponding to "halsey". In another example, when the display data 205 corresponds to content responsive to the spoken input "how do you make a chocolate cake", the model builder component 230 may generate an ASR FST including a node corresponding to "foodnetwork" and a node corresponding to "cafedelites".

It will be appreciated that the nodes of an ASR FST, generated by the model builder component 230, may refer to the NER entities represented in the display-specific NLU model generated by the model builder component 230 for the same display data 215. However, whereas the model builder component 230 may generate a different FSTs for different intents, the model builder component 230 may generate a single ASR FST for the display data 215. Moreover, while the above examples describe a node of an ASR FST corresponding to a NER entity, it will be appreciated that a node of an ASR FST may only correspond to a portion of a NER entity. For example, if a NLU FST includes a node corresponding to "dontstartnow", the ASR FST may include a node corresponding to "dont", a node corresponding to "start", and a node corresponding to "now".

In at least some examples, each node in an ASR FST may correspond to a single phoneme. As used herein, a "phoneme" refers to a perceptually distinct sound in a specified language that distinguishes one word from another. For example, the sounds corresponding to the letters "p", "b", "d", and "t" may be referred to as phonemes in the English words "pad", "pat", "bad", and "bat".

To construct such an ASR FST, the model builder component 230 may have access to one or more grapheme-to-phoneme models (stored in an on-device grapheme-to-phoneme model(s) storage 250). As used herein, a "grapheme" refers to a unit of writing corresponding to a sound. For example, "sh" in the English word "shake" may be a grapheme corresponding to the sound made when speaking "sh" in the word "shake". The model builder component 230 may use one or more grapheme-to-phoneme models to generate an ASR FST including nodes corresponding to phonemes representing entities represented in the display data 215. An ASR FST, generated based on the display data 215, may be referred to herein as a "display-specific ASR model". However, one skilled in the art will appreciate that various techniques may be used to generate a display-specific ASR model and, as such, the present disclosure is not limited to generating such a model to include a FST as described herein.

The model builder component 230 may send a display-specific ASR model to a display-specific ASR model storage 260. If the device 110 is associated with a single display 105, and the display-specific ASR model storage 260 includes a display-specific ASR model corresponding to content previously presented on the display 105, the model builder component 230 may cause the display-specific ASR model (corresponding to the previously presented content) to be deleted from the display-specific ASR model storage 260. Such may ensure that the only display-specific ASR model, in the display-specific ASR model storage 260, corresponds to content being presented on the display 105 when a spoken input is received.

If the device 110 is associated with a multiple displays 105, the display-specific ASR model storage 260 may include a display-specific ASR model for each display 105 associated with the device 110. With respect to each display, as described above, the model builder component 230 may delete and store display-specific ASR models such that only one display-specific ASR model is associated with a given display 105 in the storage at a time. As such, a display-specific ASR model, in the display-specific ASR model storage 260, may be associated with a unique identifier (e.g., a serial number, display name, etc.) corresponding to the display 105 to which the display-specific ASR model corresponds.

At runtime, an ASR component 350, of the device 110, may use a display-specific ASR model(s) in conjunction with a static ASR model(s) stored by the device 110 (e.g., in static ASR model storage 270). A static ASR model may include one or more FSTs (or other ASR model structure presently and not yet known) corresponding to spoken inputs not specific to what is currently being presented on a display 105. In other words, a static ASR model may not be changed based on the specific content that is being presented on a display 105. For example, a static ASR model may correspond to spoken inputs to increase a volume of output audio, decrease a volume of output audio, pause the output of audio, pause the playing of video content, etc. One skilled in the art will appreciate that these foregoing spoken inputs are merely illustrative, and that various other non-display-specific spoken inputs may be represented a static ASR model of the present disclosure.

The foregoing describes processing that may be performed by the device 110 in response to a display rendering component 210 determining new display data 215 representing content to be rendered on a display 105. The following describes processing that may be performed in response to the device 110 detecting a spoken input.

Figure 3:
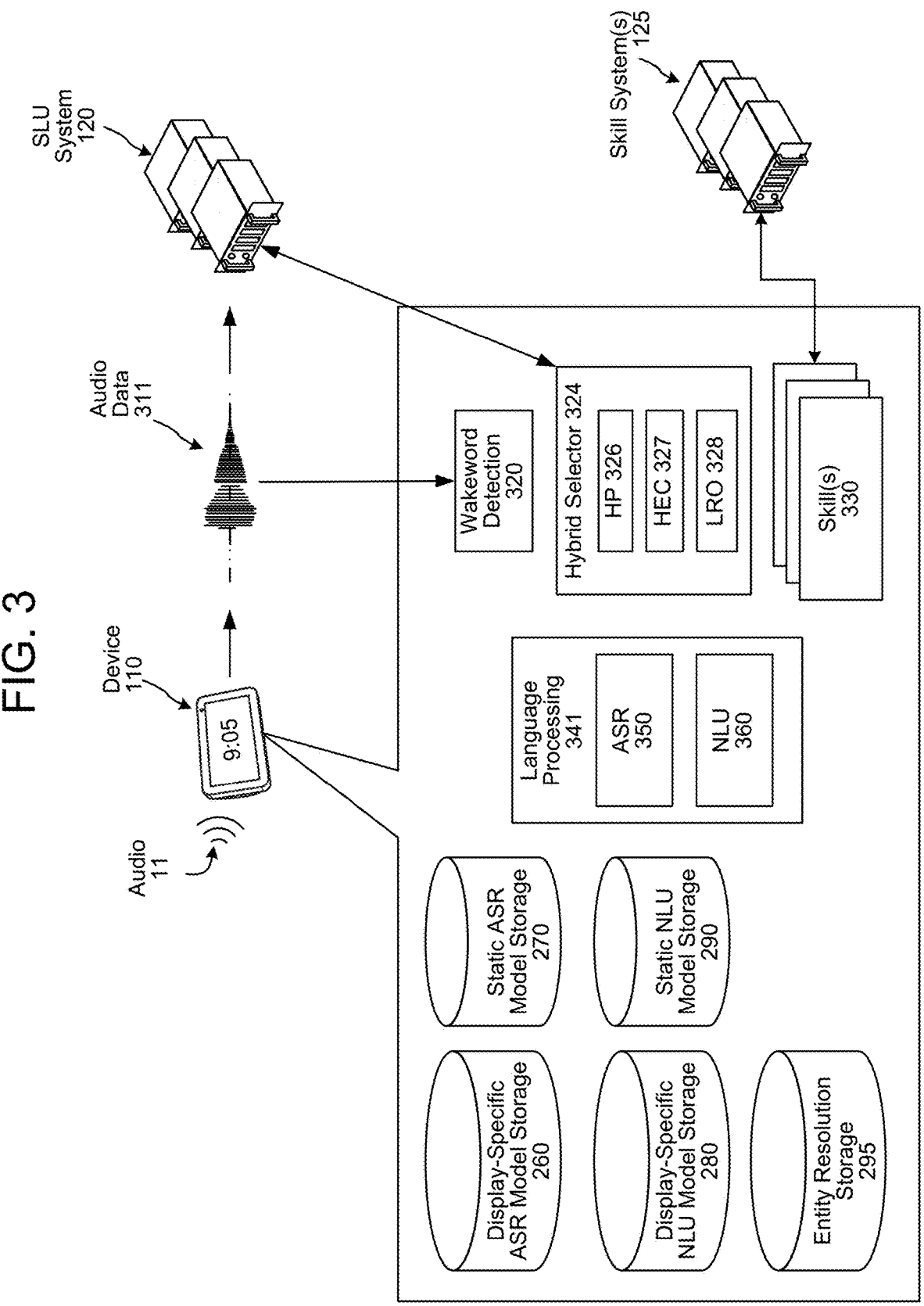
FIG. 3 is a conceptual diagram illustrating processing that may be performed by a device in response to a spoken input, according to embodiments of the present disclosure.

As illustrated in FIG. 3, an audio capture component(s), such as a microphone or array of microphones of the device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once the device 110 detects speech in audio data representing the audio 11, the device 110 may use a wakeword detection component 320 to perform wakeword detection to determine when the user 5 intends to speak an input to the device 110/SLU system 120. The wakeword detection component 320 may be configured to detect one or more wakewords. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword detection component 320 detects a wakeword, the device 110 may "wake" and audio data 311, representing the speech (illustrated as audio 11 in FIG. 3), to a router component 330 of the device 110. The audio data 311 may include data corresponding to the detected wakeword, or such portion of the audio may be removed prior to the audio data 311 being sent to hybrid selector 324.

The hybrid selector 324 may include a hybrid proxy (HP) 326. The HP 326 may be configured to proxy traffic to/from the SLU system 120. For example, the HP 326 may be configured to send messages to/from a hybrid execution controller (HEC) 327 of the hybrid selector 324. For example, command/directive data received from the SLU system 120 can be sent to the HEC 327 using the HP 326.

The HP 326 may also be configured to allow audio data 311 to pass through to the SLU system 120 while also receiving (e.g., intercepting) this audio data 311 and sending the received audio data 311 to the HEC 327.

The hybrid selector 324 may send the audio data 311 to the SLU system 120 (to commence SLU processing of the spoken input by the SLU system 120). The following is a description of how the SLU system 120 may process a spoken input. Following such a description will be a description of how the device 110 may process the same spoken input.

Figure 4:
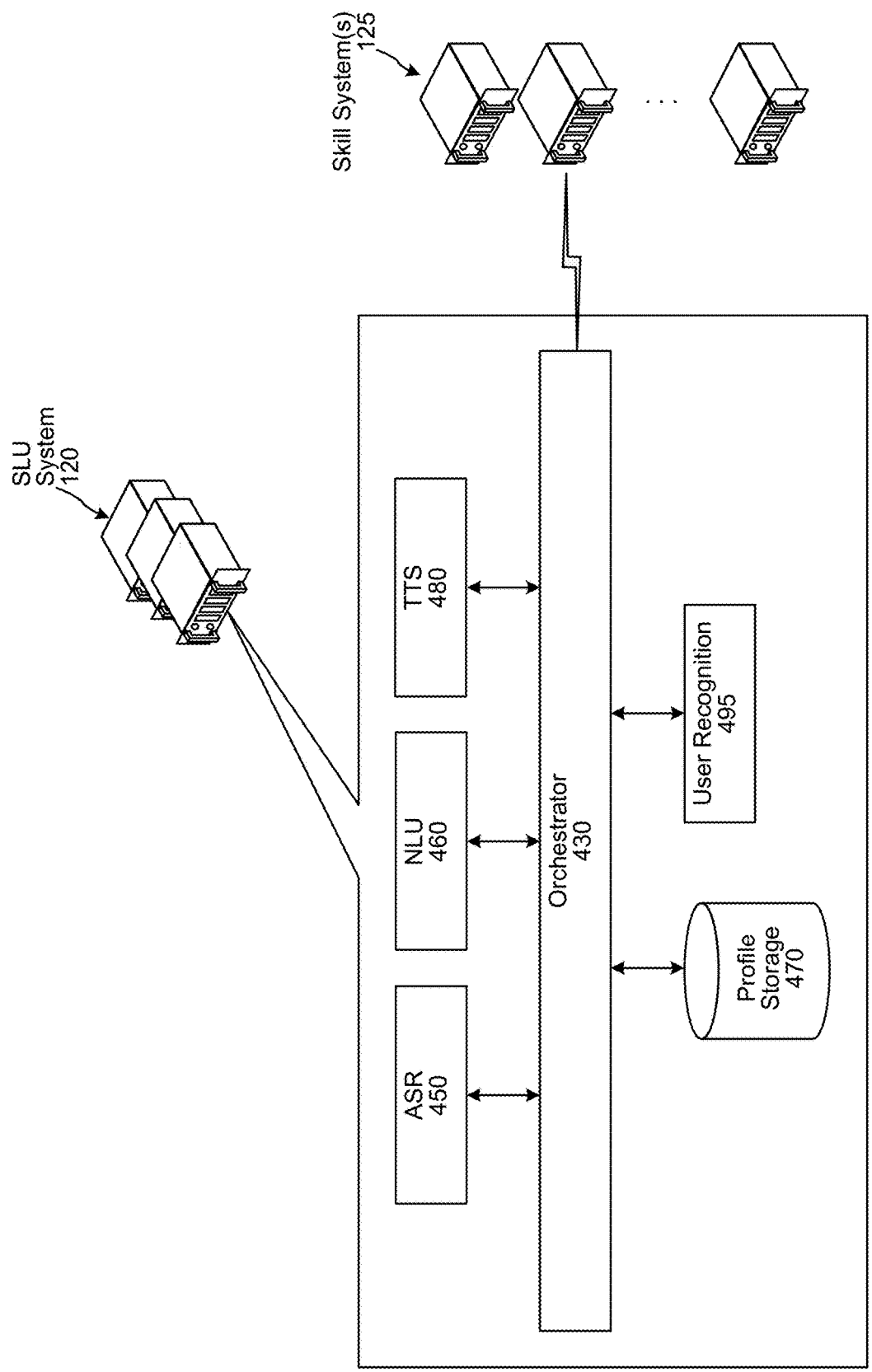
FIG. 4 is a conceptual diagram of components of a SLU system, according to embodiments of the present disclosure.
Figure 5:
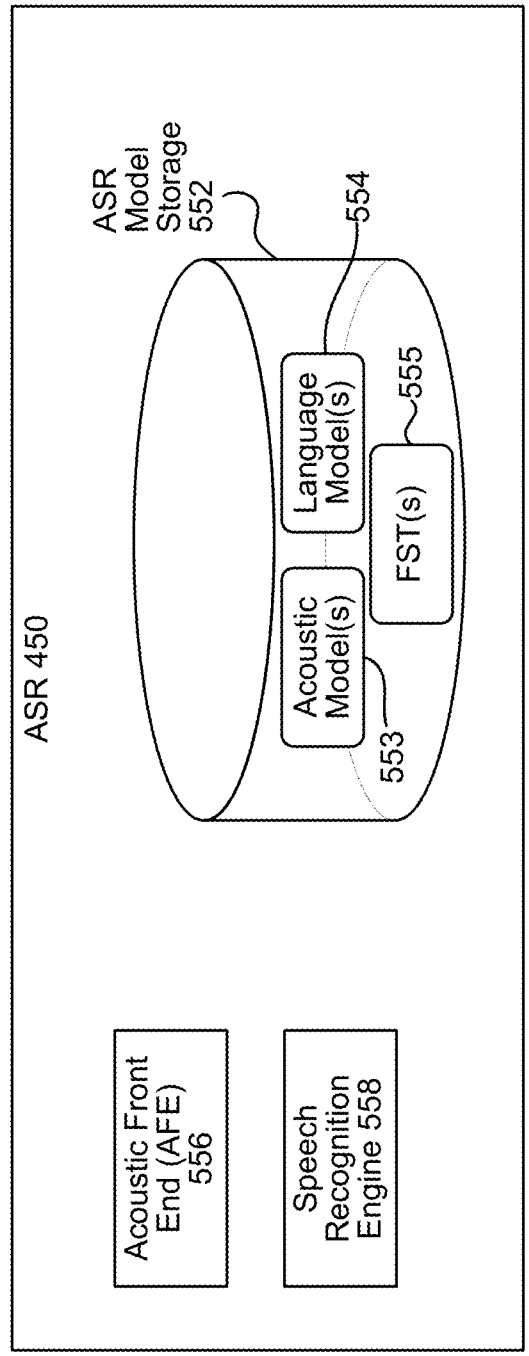
FIG. 5 is a conceptual diagram of an automatic speech recognition (ASR) component of the SLU system, according to embodiments of the present disclosure.

Referring to FIG. 4, the SLU system 120 may include an orchestrator component 430 configured to receive the audio data 411 from the device 110. The orchestrator component 430 may send the audio data 411 to an ASR component 450 (conceptually illustrated in FIG. 5).

The ASR component 450 transcribes the audio data 411 into one or more ASR output data representing the speech represented in the audio data 411. In at least some embodiments, the ASR output data may be a token representing the speech. In at least some other embodiments, the ASR output data may include one or more textual representations of the speech.

The ASR component 450 may interpret a spoken input based on a similarity between the spoken input and pre-established language models 554 stored in an ASR model storage 552. For example, the ASR component 450 may compare the audio data 411 with models for sounds (e.g., subword units or phonemes) and sequences of sounds to identify words that match the sequence of sounds included in the spoken input. Alternatively, the ASR component 450 may use a finite state transducer (FST) 555 to implement the language model functions.

When the ASR component 450 generates more than one ASR hypothesis for a single spoken input, each ASR hypothesis may be assigned a score (e.g., probability score, confidence score, etc.) representing a likelihood that the corresponding ASR hypothesis matches the spoken input (e.g., representing a likelihood that a particular set of words matches those spoken in the input). The score may be based on a number of factors including, for example, the similarity of the sound in the spoken input to models for language sounds (e.g., an acoustic model 553 stored in the ASR model storage 552), and the likelihood that a particular word, which matches the sounds, would be included in the sentence at the specific location (e.g., using a language or grammar model 554). Based on the considered factors and the assigned confidence score, the ASR component 450 may output an ASR hypothesis that most likely matches the spoken input, or may output multiple ASR hypotheses in the form of a lattice or an N-best list, with each ASR hypothesis corresponding to a respective score.

The ASR component 450 may include an acoustic front end (AFE) 556 and a speech recognition engine 558. The AFE 556 transforms the audio data (received from a microphone(s) of or otherwise associated with the device 110) into data for processing by the speech recognition engine 558. The speech recognition engine 558 compares the data (output by the AFE 556) with acoustic models 553, language models 554, FST(s) 555, and/or other data models and information for recognizing the speech conveyed in the audio data. The AFE 556 may reduce noise in the audio data and divide the digitized audio data into frames representing time intervals for which the AFE 556 determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by the AFE 556 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 558 may process the data, output from the AFE 556, with reference to information stored in the ASR model storage 552. Alternatively, post front-end processed data (such as feature vectors) may be received by the ASR component 450 from another source besides the internal AFE 556. For example, the device 110 may process audio data into feature vectors (for example using an on-device AFE 556) and transmit that information to the SLU system 120 for ASR processing. Feature vectors may arrive at the SLU system 120 encoded, in which case they may be decoded prior to processing by the speech recognition engine 558.

The speech recognition engine 558 attempts to match received feature vectors to language phonemes and words as known in the stored acoustic models 553, language models 554, and FST(s) 555. The speech recognition engine 558 computes scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 450 will output ASR hypotheses that make sense grammatically. The specific models used may be general models or may be models corresponding to a particular domain, such as music, banking, etc.

The speech recognition engine 558 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 558 may use the acoustic model(s) 553 to attempt to match received audio feature vectors to words or subword units. A subword unit may be a senon, phoneme, phoneme in context, syllable, part of a syllable, syllable in context, or any other such portion of a word. The speech recognition engine 558 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 450 outputs ASR hypotheses that make sense grammatically.

The speech recognition engine 558 may use a number of techniques to match feature vectors to phonemes or other phonetic units, such as biphones, triphones, etc. One common technique is using Hidden Markov Models (HMMs).

HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 558, the state may change or stay the same, based on the processing of the new feature vectors. A Viterbi algorithm may be used to find the most likely sequence of states based on the processed feature vectors.

In one example, the speech recognition engine 558 may receive a series of feature vectors for sound corresponding to a user saying "There is a bat in my car." The speech recognition engine 558 may attempt to match each feature vector with a phoneme. As new feature vectors are processed, the speech recognition engine 558 may determine state transitions (for example, using HMMs) to determine whether a probability of whether a state should either remain the same, or change to a new state (i.e., whether an incoming feature vector results in a state transition from one phoneme to another). As the processing continues, the speech recognition engine 558 continues calculating such state transition probabilities. After processing one feature vector, the speech recognition engine 558 may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 558 may also calculate potential states for other phonemes. In this manner multiple states and state transition probabilities may be calculated.

The probable states and probable state transitions calculated by the speech recognition engine 558 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score, or probabilities may be converted to the log domain and added to assist processing.

The speech recognition engine 558 may also compute scores of branches of the paths based on language models or grammars. Language modeling involves determining scores for what words are likely to be used together to form coherent words and sentences. Application of a language model 554 may improve the likelihood that the ASR component 450 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken natural language input. The language modeling may be determined from a text corpus and may be customized for particular applications.

Figure 6:
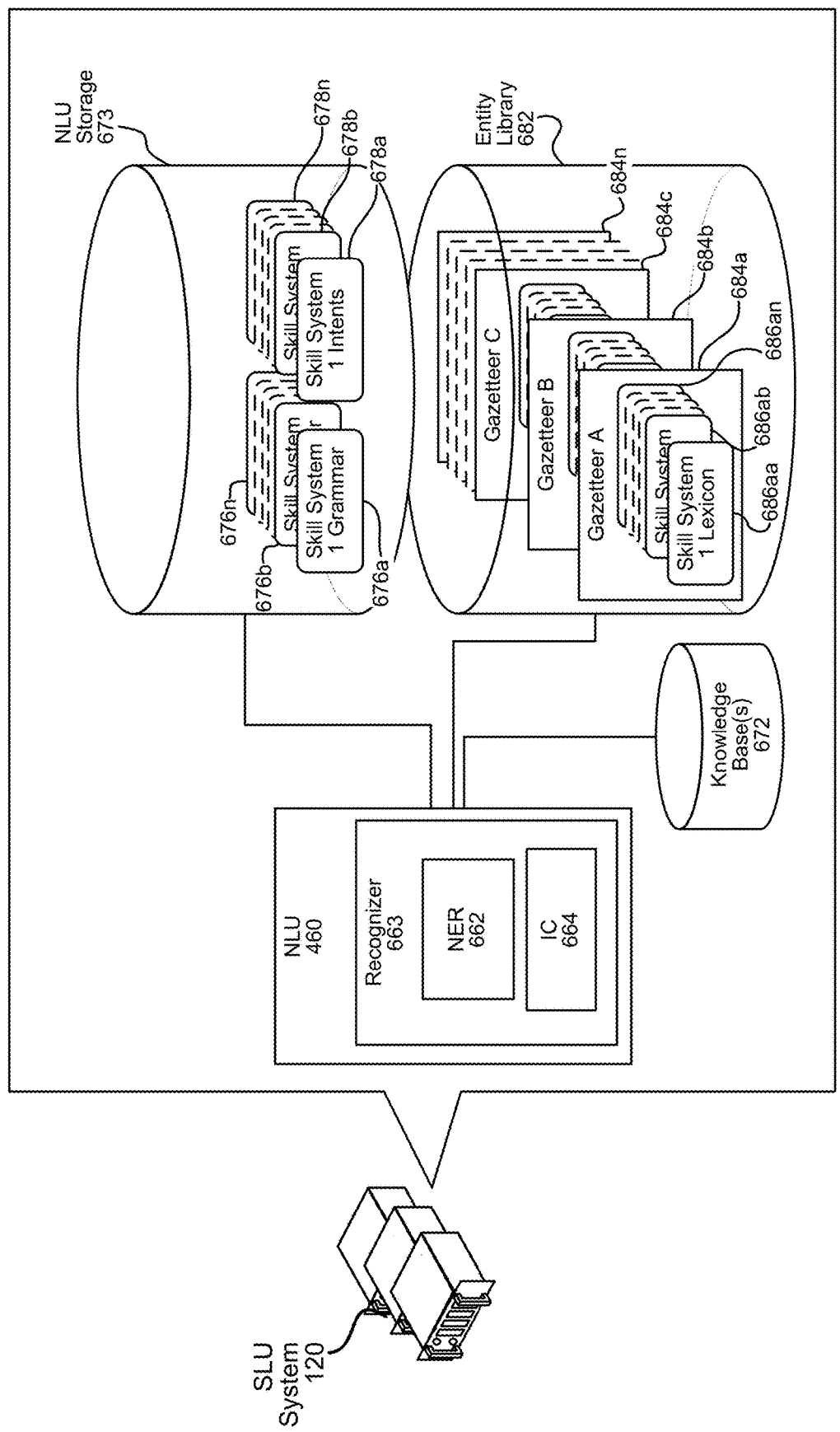
FIG. 6 is a conceptual diagram of how natural language processing may be performed by the SLU system, according to embodiments of the present disclosure.

Referring back to FIG. 4, the ASR component 450 may send ASR output data to the orchestrator component 430, which may send the ASR output data to a NLU component 460 of the SLU system 120. FIG. 6 illustrates how the NLU component 460 may perform NLU processing.

The NLU component 460 may include one or more recognizers 663. In at least some embodiments, a recognizer 663 may be associated with a skill system 125 (e.g., the recognizer may be configured to interpret text data to correspond to the skill system 125). In at least some other examples, a recognizer 663 may be associated with a domain (e.g., the recognizer may be configured to interpret text data to correspond to the domain).

Recognizers 663 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system.

The NLU component 460 may communicate with various storages. The NLU component 460 may communicate with an NLU storage 673, which includes skill system grammars (676a-676n), representing how natural language inputs may be formulated to invoke skill systems 125, and skill system intents (678a-678n) representing intents supported by respective skill systems 125.

Each recognizer 663 may be associated with a particular grammar 676, a particular intent(s) 678, and a particular personalized lexicon 686 (stored in an entity library 682). A gazetteer 684 may include skill system-indexed lexical information associated with a particular user. For example, Gazetteer A (684a) may include skill system-indexed lexical information 686aa to 686an. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 663 may include a NER component 662 that attempts to identify grammars and lexical information that may be used to construe meaning with respect to text data input therein. A NER component 662 identifies portions of text data that correspond to a named entity that may be recognizable by the SLU system 120. A NER component 662 may also determine whether a word refers to an entity that is not explicitly mentioned in the text, for example "him," "her," "it" or other anaphora, exophora or the like.

A NER component 662 applies grammar models 676 and lexical information 686 associated with one or more skill systems 125 to determine a mention of one or more entities in text data input therein. In this manner, a NER component 662 identifies "slots" (i.e., particular words in text data) that may be needed for later processing. A NER component 662 may also label each slot with a type (e.g., noun, place, city, artist name, song name, etc.).

Each grammar model 676 may include the names of entities (i.e., nouns) commonly found in speech about a particular skill system 125 to which the grammar model 676 relates, whereas lexical information 686 may be personalized to the user identifier output by a user recognition component 495 for the natural language input. For example, a grammar model 676 associated with a shopping skill system may include a database of words commonly used when people discuss shopping.

A downstream process called named entity resolution actually links a portion of text data (identified by a NER component 662) to a specific entity known to the SLU system 120. To perform named entity resolution, the NLU component 460 may use gazetteer information (684a-684n) stored in the entity library storage 682. The gazetteer information 684 may be used to match text data (identified by a NER component 662) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner.

Each recognizer 663 may also include an IC component 664 that processes text data input thereto to determine an intent(s) of a skill system(s) 125 that potentially corresponds to the natural language input represented in the text data. An intent corresponds to an action to be performed that is responsive to the natural language input represented by the text data. An IC component 664 may communicate with a database 678 of words linked to intents. For example, a music intent database may link words and phrases such as "quiet," "volume off," and "mute" to a <Mute> intent. An IC component 664 identifies potential intents by comparing words and phrases in text data to the words and phrases in an intents database 678 associated with the skill system(s) 125 that is associated with the recognizer 663 implementing the IC component 664.

The intents identifiable by a specific IC component 664 may be linked to one or more skill system-specific grammar frameworks 676 with "slots" to be filled. Each slot of a grammar framework 576 corresponds to a portion of text data that a NER component 662 believes corresponds to an entity. For example, a grammar framework 676 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 676 may not be structured as sentences, but rather based on associating slots with grammatical tags.

For example, a NER component 662 may identify words in text data as subject, object, verb, preposition, etc. based on grammar rules and/or models prior to recognizing named entities in the text data. An IC component 664 (implemented by the same recognizer 663) may use the identified verb to identify an intent. The NER component 662 may then determine a grammar model 676 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 662 may then search corresponding fields in a lexicon 686, attempting to match words and phrases in the text data the NER component 662 previously tagged as a grammatical object or object modifier with those identified in the lexicon 686.

A NER component 662 may perform semantic tagging, which is the labeling of a word or combination of words according to their type/semantic meaning. A NER component 662 may parse text data using heuristic grammar rules, or a model may be constructed using techniques such as hidden Markov models, maximum entropy models, log linear models, conditional random fields (CRF), and the like. For example, a NER component 662, implemented by a music skill system or music domain recognizer 663, may parse and tag text data corresponding to "play mother's little helper by the rolling stones" as {Verb}: "Play," {Object}: "mother's little helper," {Object Preposition}: "by," and {Object Modifier}: "the rolling stones." The NER component 662 may identify "Play" as a verb based on a word database associated with the music skill system or music domain, which an IC component 664 may determine corresponds to a <PlayMusic> intent. At this stage, no determination has been made as to the meaning of "mother's little helper" and "the rolling stones," but based on grammar rules and models, the NER component 662 has determined that the text of these phrases relates to the grammatical object (i.e., entity).

The frameworks linked to the intent are then used to determine what database fields should be searched to determine the meaning of these phrases, such as searching a user's gazetteer 684 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 684 does not resolve a slot/field using gazetteer information, the NER component 662 may search a database of generic words (in the knowledge base 672). For example, if the text data corresponds to "play songs by the rolling stones," after failing to determine an album name or song name called "songs" by "the rolling stones," the NER component 662 may search a music skill system vocabulary for the word "songs." In the alternative, generic words may be checked before the gazetteer information, or both may be tried, potentially producing two different results.

A recognizer 663 may tag text data to attribute meaning thereto. For example, a recognizer 663 may tag "play mother's little helper by the rolling stones" as: {skill system} Music, {intent} Play Music, {artist name} rolling stones, {media type} SONG, and {song title} mother's little helper. For further example, a recognizer 663 may tag "play songs by the rolling stones" as: {skill system} Music, {intent} Play Music, {artist name} rolling stones, and {media type} SONG.

As described above, more than one recognizer 663 may process with respect to text data representing a single natural language input. In such instances, each recognizer 663 may output at least one NLU hypothesis including an intent indicator (determined by an IC component 664 of the recognizer 663) and at least one tagged named entity (determined by a NER component 662 of the recognizer 663).

Figure 7:
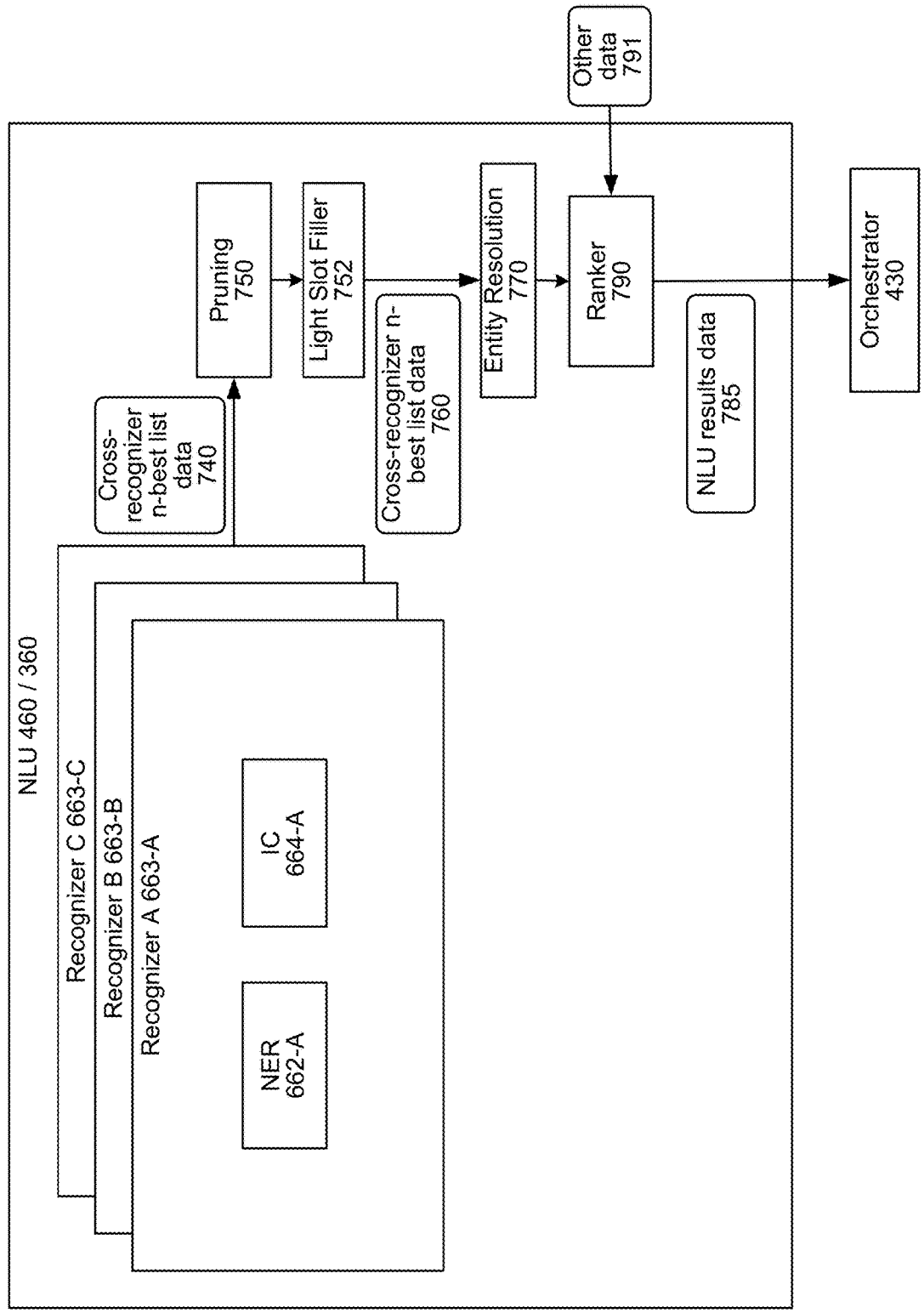
FIG. 7 is a conceptual diagram of how natural language processing may be performed by the SLU system, according to embodiments of the present disclosure.

The NLU component 460 may compile the NLU hypotheses (output by multiple recognizers 663) into cross-recognizer N-best list data 740 (illustrated in FIG. 7). Each NLU hypothesis may be associated with a respective score indicating a likelihood that the NLU hypothesis corresponds to the domain, one or more skill systems 125, etc. associated with the recognizer 663 from which the NLU hypothesis was output. For example, the cross-recognizer N-best list data 740 may be represented as:

[0.95] Intent: <PlayMusic> Entity: Leftmost
[0.70] Intent: <PlayVideo> Entity: Leftmost with each line of the foregoing corresponding to a different NLU hypothesis and associated score.

The NLU component 460 may send the cross-recognizer N-best list data 740 to a pruning component 750, which sorts the NLU hypotheses, represented in the cross-recognizer N-best list data 740, according to their respective scores. The pruning component 750 may then perform score thresholding with respect to the cross-recognizer N-best list data 740. For example, the pruning component 750 may select NLU hypotheses, represented in the cross-recognizer N-best list data 740, associated with scores satisfying (e.g., meeting and/or exceeding) a threshold score. The pruning component 750 may additionally or alternatively perform number of NLU hypothesis thresholding. For example, the pruning component 750 may select a threshold number of top-scoring NLU hypotheses represented in the cross-recognizer N-best list data 740.

The pruning component 750 may generate cross-recognizer N-best list data 760 including the selected NLU hypotheses. The purpose of the pruning component 750 is to create a reduced list of NLU hypotheses so that downstream, more resource intensive, processes may only operate on NLU hypotheses that most likely represent the natural language input.

The NLU component 460 may include a light slot filler component 752 that takes text from slots, represented in the NLU hypotheses output by the pruning component 750, and alter it to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a NLU hypothesis includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the cross-recognizer N-best list data 760.

The cross-recognizer N-best list data 760 may be sent to an entity resolution component 770. The entity resolution component 770 can apply rules or other instructions to standardize labels or tokens in the NLU hypotheses represented in the cross-recognizer N-best list data 760. The precise transformation may depend on the skill system 125, domain, etc. to which a NLU hypothesis relates. For example, for a travel skill system-specific NLU hypothesis, the entity resolution component 770 may transform text corresponding to "Boston airport" to the standard BOS three-letter code referring to the airport. The entity resolution component 770 can refer to a knowledge base that is used to specifically identify the precise entity referred to in each slot of each NLU hypothesis represented in the cross-recognizer N-best list data 760.

Specific intent/slot combinations may also be tied to a particular source, which may then be used to resolve the text. In the example "play songs by the stones," the entity resolution component 770 may reference a personal music catalog, Amazon Music account, a user profile, or the like. The entity resolution component 770 may output N-best list data, altered from the cross-recognizer N-best list data 760, that includes more detailed information (e.g., entity IDs) about the specific entities mentioned in the slots and/or more detailed slot data that can eventually be used by a skill system 125 to perform an action responsive to the natural language input. The NLU component 460 may include multiple entity resolution components 770 that are each specific to one or more different skill systems 125, domains, etc.

The entity resolution component 770 may not be successful in resolving every entity and filling every slot represented in the NLU hypotheses represented in the cross-recognizer N-best list data 760. This may result in the entity resolution component 770 outputting incomplete results.

The entity resolution component 770 may process with respect to the display data 215, which is also input to the model builder component 230 of the device 110. Whereas the model builder component 230 may use the display data 215 to generate one or more SLU models, the entity resolution component 770 may use the display data 215 as context when resolving ambiguous entities (e.g., "leftmost", "third", etc.) represented in the cross-recognizer n-best list data 760. For example, the entity resolution component 770 may use the display data 215 to determine the entity "leftmost" corresponds to an image corresponding to a particular video displayed on the display 105.

The NLU component 460 may include a ranker component 790 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 790 may assign the first NLU hypothesis a higher score than a second NLU hypothesis including at least one slot that is unfilled/unresolved by the entity resolution component 770.

The ranker component 790 may apply re-scoring, biasing, or other techniques. To do so, the ranker component 790 may consider not only the data output by the entity resolution component 770, but may also consider other data 791. The other data 791 may include a variety of information.

For example, the other data 791 may include skill system 125 rating or popularity data. For example, if a skill system 125 has a high rating, the ranker component 790 may increase the score of a NLU hypothesis associated with that skill system 125, and vice versa.

The other data 791 may additionally or alternatively include information about skill systems 125 that have been enabled by the user that originated the natural language input. For example, the ranker component 790 may assign higher scores to NLU hypotheses associated with enabled skill systems 125 than NLU hypotheses associated with skill systems 125 that have not been enabled by the user.

The other data 791 may additionally or alternatively include data indicating system usage history (e.g., specific to the user), such as if the user, that originated the natural language input, regularly invokes a particular skill system 125 or does so at particular times of day. The other data 791 may additionally or alternatively include data indicating date, time, location, weather, type of device 110, user identifier, context, as well as other information. For example, the ranker component 790 may consider when any particular skill system 125 is currently active with respect to the present user and/or device 110 (e.g., music being output by the skill system 125, a game being executed by the skill system 125, etc.).

The ranker component 790 may output NLU results data 285 including one or more NLU hypotheses. The NLU component 460 may send the NLU results data 485 to the orchestrator component 430.

As described above, the SLU system 120 may perform speech processing using two different components (e.g., the ASR component 450 and the NLU component 460). One skilled in the art will appreciate that the SLU system 120, in at least some embodiments, may implement a spoken language understanding (SLU) component that is configured to process audio data 411 to generate NLU results data.

In some examples, the SLU component may be equivalent to the ASR component 450 and the NLU component 460. While the SLU component may be equivalent to a combination of the ASR component 450 and the NLU component 460, the SLU component may process audio data 411 and directly generate the NLU results data, without an intermediate step of generating text data (as does the ASR component 450). As such, the SLU component may take audio data 411 representing speech and attempt to make a semantic interpretation of the speech. That is, the SLU component may determine a meaning associated with the speech and then implement that meaning. For example, the SLU component may interpret audio data 411 representing speech from the user 5 in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

Referring again to FIG. 4, after receiving the NLU results data 785, the orchestrator component 430 may send the NLU results data 285 to a skill system 125. The SLU system 120 may communicate with a variety of skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the SLU system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The SLU system 120 may include a TTS component 480. The TTS component 480 may generate audio data (e.g., synthesized speech) from text data using one or more different methods. Text data input to the TTS component 480 may come from a skill system 125, the orchestrator component 430, or another component of the system 100.

In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to generate audio data including an artificial speech waveform. Parametric synthesis uses a computerized voice generator, sometimes called a vocoder.

The SLU system 120 may include a user recognition component 495. In at least some embodiments, the user recognition component 495 may be implemented as a skill system 125.

The user recognition component 495 may recognize one or more users using various data. The user recognition component 495 may take as input the audio data 411 and/or the text data 413. The user recognition component 495 may perform user recognition by comparing speech characteristics, in the audio data 411, to stored speech characteristics of users. The user recognition component 495 may additionally or alternatively perform user recognition by comparing biometric data (e.g., fingerprint data, iris data, etc.), received by the SLU system 120 in correlation with a natural language input, to stored biometric data of users. The user recognition component 495 may additionally or alternatively perform user recognition by comparing image data (e.g., including a representation of at least a feature of a user), received by the SLU system 120 in correlation with a natural language input, with stored image data including representations of features of different users. The user recognition component 495 may perform other or additional user recognition processes, including those known in the art. For a particular natural language input, the user recognition component 495 may perform processing with respect to stored data of users associated with the device 110 that captured the natural language input.

The user recognition component 495 determines whether a natural language input originated from a particular user. For example, the user recognition component 495 may generate a first value representing a likelihood that a natural language input originated from a first user, a second value representing a likelihood that the natural language input originated from a second user, etc. The user recognition component 495 may also determine an overall confidence regarding the accuracy of user recognition operations.

The user recognition component 495 may output a single user identifier corresponding to the most likely user that originated the natural language input. Alternatively, the user recognition component 495 may output multiple user identifiers (e.g., in the form of an N-best list) with respective values representing likelihoods of respective users originating the natural language input. The output of the user recognition component 495 may be used to inform NLU processing, processing performed by a skill system 125, as well as processing performed by other components of the SLU system 120 and/or other systems.

The SLU system 120 may include profile storage 470. The profile storage 470 may include a variety of information related to individual users, groups of users, devices, etc. that interact with the SLU system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 470 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the SLU system 120 with permission to allow the skill system 125 to execute with respect to the user's natural language inputs. If a user does not enable a skill system 125, the SLU system 120 may not invoke the skill system 125 to execute with respect to the user's natural language inputs.

The profile storage 470 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 470 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Whereas the foregoing discusses processing that may be performed by the SLU system 102 in response to the device 110 receiving a spoken input, the following describes processing that may be performed by the device 110 in response to the device 110 receiving the spoken input. Referring again to FIG. 3, the hybrid selector 324 may include a local request orchestrator (LRO) 328. The LRO 328 is configured to notify a local language processing component 341 about the availability of new audio data 311 that represents user speech, and to otherwise initiate the operations of the local language processing component 341 when new audio data 311 becomes available.

Thus, when audio data 311 is received by the hybrid selector 324, the HP 326 may allow the audio data 311 to pass through to the SLU system 120, and the HP 326 may also input the audio data 311 to the on-device language processing component 341 by routing the audio data 311 through the HEC 327 of the hybrid selector 324, whereby the LRO 328 notifies the local language processing component 341 of the incoming audio data 311. At this point, the hybrid selector 324 may wait for response data from either or both of the SLU system 120 or the local language processing component 341. However, the disclosure is not limited thereto, and in other examples the hybrid selector 324 may send the audio data 311 only to the local language processing component 341 without departing from the disclosure. For example, the device 110 may process the audio data 311 locally without sending the audio data 311 to the SLU system 120.

The local language processing component 341 is configured to receive the audio data 311 from the hybrid selector 324 as input, to recognize speech in the audio data 311, to determine a user intent from the recognized speech, and to determine how to act on the user intent by generating NLU results data which may include directive data (e.g., data instructing a component to perform an action). Such NLU results data may take a form similar to that as determined by the NLU operations by the SLU system 120. In some cases, a directive may include a description of the intent. In some cases, a directive may include (e.g., encode) an identifier of a second device(s), such as kitchen lights, and an operation to be performed at the second device. Directive data that is generated by the local language processing component 341 (and/or the SLU system 120) may be formatted using Java, such as JavaScript syntax, or JavaScript-based syntax. This may include formatting the directive using JSON. In at least some embodiments, a device-generated directive may be serialized. In at least some embodiments, a device-generated directive may be formatted as a programmatic API call with a same logical operation as a remotely-generated directive. In other words, a device-generated directive may mimic remotely-generated directives by using a same, or a similar, format as the remotely-generated directive.

The language processing component 341 may process the audio data 311 to determine local NLU data, which may include intent data and/or slot data so that directives may be determined based on the intent data and/or the slot data. Thus, the language processing component 341 may process the audio data 311 and attempt to make a semantic interpretation of the speech represented by the audio data 311 (e.g., determine a meaning associated with the speech) and then implements that meaning. For example, the language processing component 341 may interpret the audio data 311 in order to derive an intent or a desired action or operation from the user 5. This may include deriving pertinent pieces of information from the speech that allow the language processing component 341 to identify a second device in the environment, if the user, for example, intends to control a second device (e.g., a light in the user 5's house). The local language processing component 341 may also provide a dialog management function to engage in speech dialogue with the user 5 to determine (e.g., clarify) user intents by asking the user 5 for information using speech prompts.

The language processing component 341 may include an ASR component 350 that transcribes the audio data 311 into one or more ASR hypotheses embodied in ASR output data (e.g., one or more different textual or symbolic representations of the speech contained in the audio data 311). The ASR output data can include a ranked list of ASR hypotheses, or the top-scoring ASR hypothesis, when multiple ASR hypotheses are generated for a single spoken input.

It will be appreciated that the ASR component 350 may perform similar processes to those described above with respect to the SLU system-implemented ASR component 450. However, since the ASR component 350 is implemented by the device 110, the ASR component 350 may be configured to have a smaller memory footprint than the ASR component 450. Moreover, the ASR component 350 may perform ASR processing using display-specific and static ASR models stored in the display-specific ASR model storage 260 and static ASR model storage 270, respectively.

The ASR component 350 may send ASR output data (including one or more textual or symbolic data corresponding to one or more likely transcriptions of the speech in the audio data 311) to a NLU component 360 of the language processing component 341.

The NLU component 360 can interpret the ASR output data to determine one or more NLU hypotheses embodied in NLU results data (e.g., one or more different intents and corresponding entities). The NLU results data can include a ranked list of NLU hypotheses, or the top-scoring NLU hypothesis, when multiple NLU hypotheses are generated for a single spoken input.

The NLU component 360 may include the same components as the SLU system-implemented NLU component 460 (illustrated in and described herein with respect to FIG. 7). As such, the NLU component 360 may perform similar or identical processes to those described above with respect to the SLU system-implemented NLU component 460.

In at least some embodiments, the device-implemented NLU component 360 may be configured to have a smaller memory footprint than the SLU system-implemented NLU component 460. In such embodiments, the NLU component 360 may include the same components as the NLU component 460, but may be configured to detect and recognize fewer spoken inputs than are detectable and recognizable by the NLU component 460.

The NLU component 360 may perform NLU processing using display-specific and static NLU models stored in the display-specific NLU model storage 280 and static NLU model storage 290, respectively.

In some examples, the language processing component 341 is customized to the user 5 (or multiple users) who created a user account to which the device 110 is registered. For example, the language processing component 341 may process the audio data 311 based on known information (e.g., preferences) of the user 5, and/or on a history of previous interactions with the user 5.

NLU results as determined by the device 110 and/or the SLU system 120 may include data indicating a confidence and/or estimated accuracy of the results. Such data may come in the form of a numeric score, but may also come in different forms such as an indicator of Low, Medium, or High, a ranking, or other data. The confidence data may be set to a similar scale so that confidence data for one set of NLU results (e.g., NLU result data from the device 110) may be evaluated with regard to confidence data for another set of results (e.g., NLU result data from the SLU system 120).

Thus an NLU result may be selected as a candidate NLU result usable to respond to the user speech, and the local language processing component 341 may send local response data (e.g., local NLU result data and/or local directive data) to the hybrid selector 324, such as a "Ready-ToExecute" response, which can indicate that the local language processing component 341 has recognized an intent (and more particularly can indicate that the local language processing component 341 has determined the spoken input corresponds to presently-being displayed content, or is ready to communicate failure (e.g., if the local language processing component 341 could not recognize an intent). The hybrid selector 324 may then determine whether to use directive data from the local language processing component 341 to respond to the user speech, to use directive data received from the SLU system 120, assuming a remote response is even received (e.g., when the device 110 is able to access the SLU system 120 over the network (s) 199), or to generate output audio requesting additional information from the user 5.

Figure 8:
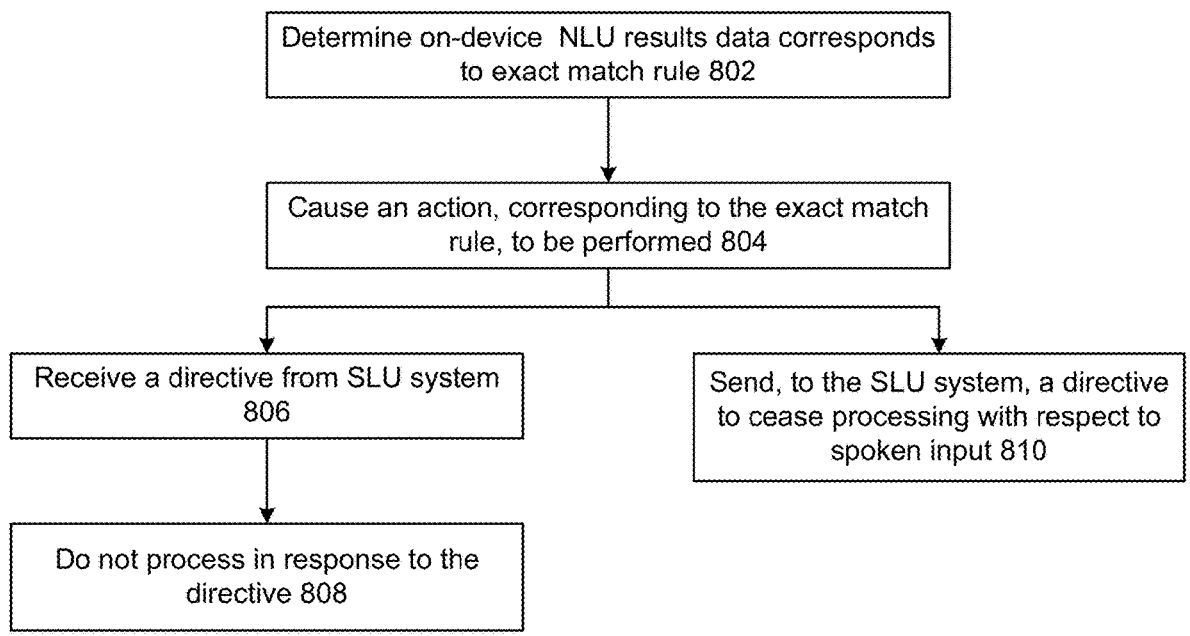
FIG. 8 is process flow diagram illustrating post-NLU processing that may be performed by the device, according to embodiments of the present disclosure.

With reference to FIG. 8, the hybrid selector 324 may determine whether the on-device NLU results data correspond to an exact match rule stored by the device 110. If the hybrid selector 324 determines (802) the on-device NLU results data corresponds to an exact match rule, the hybrid selector 324 may cause (804) an action, corresponding to the exact match rule, to be performed. For example, if the NLU results data indicates the spoken input requests different content (e.g., more search results represented in the display data 205 but not yet displayed, further information corresponding to an already being displayed entity, etc.) be presented on the display 105, the hybrid selector 324 may cause the display rendering component 210 to generate display data 215 corresponding to a new to-be presented display content, at which point the processing described with respect to FIG. 2 herein above may be performed. For further example, if the NLU results data indicates the spoken input requests video or audio (corresponding to a displayed entity, such as a movie or song) be output, the hybrid selector 324 may send a unique identifier (corresponding to the entity in the entity resolution storage 295) to the SLU system 120. In response, the device 110 may receive multimedia or audio data (depending on the situation), which the device 110 may cause to be output to the user 5. It will be appreciated that the foregoing are merely examples, and that other actions are capable of being performed in response to the hybrid selector 324 determining the on-device NLU results data corresponds to an exact match rule.

Either before or after the hybrid selector 324 determines the on-device NLU results data corresponds to an exact match rule, and either before or after the hybrid selector 324 causes the action to be performed, the device 110 may receive (806) a directive from the SLU system 120. The directive may instruct the device 110 how to process based on the SLU system 120's SLU processing of the spoken input. If the hybrid selector 324 determines the on-device NLU results data corresponds to an exact match rule stored by the device 110, the hybrid selector may simply ignore the directive received from the SLU system 120, and not (808) process in response to the directive. In the situation where the hybrid selector 324 is unable to determine the on-device NLU results data corresponds to an exact match rule stored by the device 110, the device 110 may process in response to the directive received from the SLU system 120.

In at least some situations, the hybrid selector 324 may determine, prior to receiving the directive from the SLU system 120, that the on-device NLU results data corresponds to an exact match rule stored by the device 110. In such situations, rather wait to receive a directive from the SLU system 120 and simply ignore the directive, the device 110 may send (810), to the SLU system 120, a directive to cease processing with respect to the spoken input, thereby negating the need for the SLU system 120 to generate and send a directive that will ultimately be ignored by the device 110. If the device 110 sends the directive to the SLU system 120 early enough, such directive may enable various processes to be negated (e.g., processing by a skill system 125, NLU processing performed by the NLU component 460 of the SLU system 120, etc.).

In at least some embodiments, the device 110 and/or the SLU system 120 may associate a unique identifier with each spoken input. Thus, the device 110 may include the unique identifier when sending the audio data to the SLU system 120 and the directive data (sent from the SLU system 120 to the device 110) may include the unique identifier to identify which spoken input the directive data corresponds.

Referring again to FIG. 3, the device 110 may include, or be configured to use, one or more skill components 330 that may work similarly to the skill systems 125 described above with regard to the SLU system 120. The skill components 330, installed on the device 110, may include, without limitation, the device skill component described herein above, a smart home skill components (corresponding to a smart home domain), a device control skill component (corresponding to a device control domain) to act on spoken inputs with intents to control a second device(s) in an environment of the user 5, a music skill component (corresponding to a music domain) to act on spoken inputs with intents to play music, a navigation skill component (corresponding to a navigation domain) to act on spoken inputs with intents to get navigation directions, a shopping skill component (corresponding to a shopping domain) to act on spoken inputs with intents to buy items from an electronic marketplace, and/or the like.

Additionally or alternatively, the device 110 may be in communication with skill systems 125 without departing from the disclosure.

The above describes situations in which a device 110 may generate display-specific NLU models for use at runtime for on-device SLU processing. However, the present disclosure is not limited thereto. The teachings herein may be applied to various situations in which an operational context of a device continually changes. Data, representing an operational context of a device, may be received from various sensors and other sources such as, but not limited to, a camera, a microphone, a global positioning system (GPS), presence detectors, media feeds representing displayed content, etc.

As an example, a database may be continually updated with data (e.g., representing gas stations, restaurants, hotels, a next n amount of highway exits, radio stations, etc.). It will be appreciated that such a database may be continually updated based on a changing GPS location of the vehicle. In such an example, the vehicle may perform processing to generate database-specific modeling, and use such modeling at runtime as described with respect to the display-specific models herein.

In at least some embodiments, a database may be updated at a rate too fast to generate a database-specific model. For example, as a model is being generated the database may be updated again, thereby rendering the model being generated as outdated. In such examples, the device 110 may be configured to generate a database-specific model as a specific sample rate, rather than simply every time the database is updated.

In at least some situations, the device 110 may receive a spoken input while the device 110 is generating an operational context-specific (e.g., device-specific or database-specific) model(s). In at least some embodiments, the device 110 may not perform SLU processing on the spoken input until the operational context-specific model(s) is built. In at least some other embodiments, the device 110 may perform SLU processing on the spoken input prior to the operational context-specific model(s) being built, which may result in the device 110 having to rely on the directive sent from the SLU system 120 in response to the SLU system 120's processing of the spoken input.

Throughout the specification there is discussion of how SLU models may be generated based on the operational context of a device, and namely content to be displayed. The present disclosure is not limited thereto. In at least some embodiments, existing SLU modeling may be configured based on the operational context of a device. For example, the operational context may be used to adjust ranking determinations made using existing SLU modeling, for example by adjusting weights or other parameters used in calculating such rankings. For further example, the operational context may be used to rank certain existing NLU exact match rules (corresponding to the operational context) higher than other existing NLU exact match rules not corresponding to the operational context.

Figure 9:
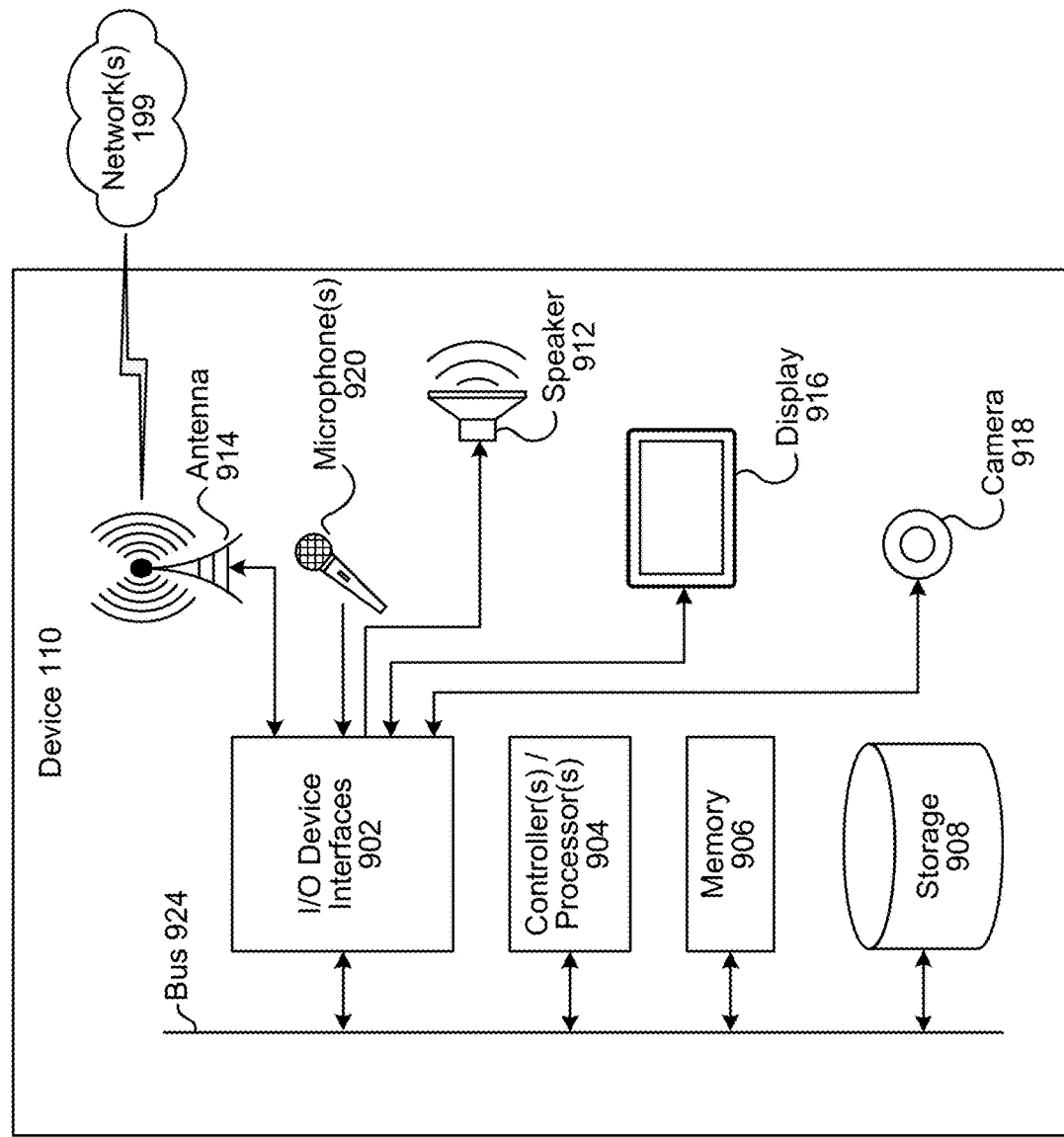
FIG. 9 is a block diagram conceptually illustrating example components of a device, according to embodiments of the present disclosure.
Figure 10:
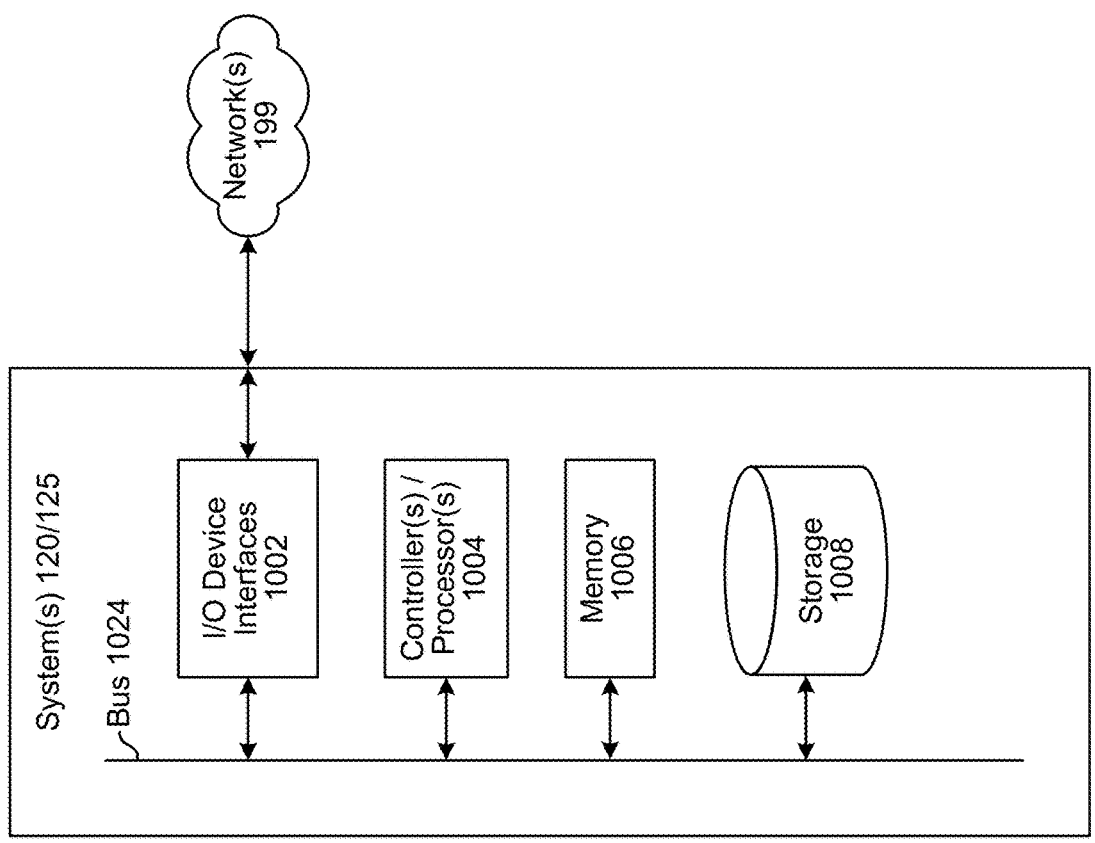
FIG. 10 is a block diagram conceptually illustrating example components of a system, according to embodiments of the present disclosure.

FIG. 9 is a block diagram conceptually illustrating a device 110 that may be used with the SLU system. FIG. 10 is a block diagram conceptually illustrating example components of a remote device, such as the SLU system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The SLU system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more SLU systems 120 for performing ASR processing, one or more SLU systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the SLU system 120, and/or a skill system 125 may include their own dedicated processors, memory, and/or storage. Alternatively, one or more of the components of the device 110, the SLU system 120, and/or a skill system 125 may utilize the I/O interfaces (902/1002), processor(s) (904/1004), memory (906/1006), and/or storage (908/1008) of the device(s) 110, system 120, or the skill system 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the SLU system 120, and a skill system 125, as described herein, are illustrative, and may be located as a stand-alone device or may be included, in whole or in part, as a component of a larger device or system.

Figure 11:
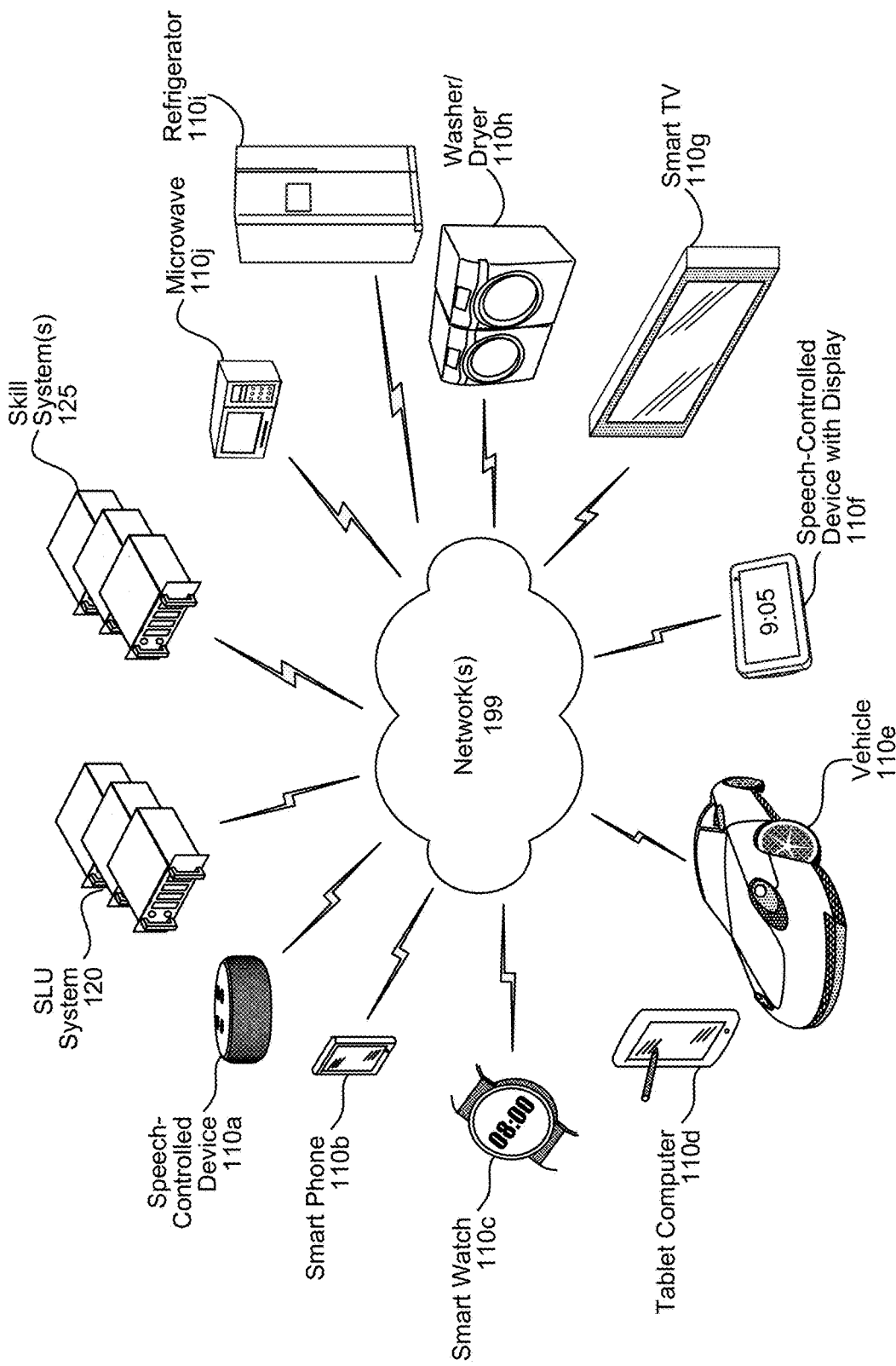
FIG. 11 illustrates an example of a computer network for use with the overall system, according to embodiments of the present disclosure.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the SLU system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the SLU system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving first data comprising:
        at least a first image, and
        first text data associated with the at least a first image, the first text data corresponding to at least a first named entity recognition (NER) entity;
    determining a first location where the first image is to be presented in a list on a first display of a first device;
    determining a first natural language understanding (NLU) exact match rule template comprising:
        a first portion capable of being populated with a name of a NER entity, and a second portion capable of being populated with display location information representing a location on a display where an image is to be presented;
    generating, by the first device, a first NLU exact match rule by:
        populating the first portion using the first text data, and
        populating the second portion using data corresponding to the first location on the first display;
    after generating the first NLU exact match rule, presenting, on the first display, the at least a first image;
    after generating the first NLU exact match rule and while presenting the at least a first image, receiving first audio data corresponding to a first spoken input;
    determining, by the first device and using the first NLU exact match rule, that the first spoken input indicates the first NER entity; and
    performing an action responsive to the first spoken input.

2. The computer-implemented method of claim 1, further comprising:
    determining a first portion, of the first text data, corresponds to a first phoneme;
    determining a second portion, of the first text data, corresponds to a second phoneme;
    generating, by the first device, a finite state transducer (FST) for use in automatic speech recognition (ASR) processing, the FST comprising:
        a first node corresponding to the first portion of the first text data, and
        a second node corresponding to the second portion of the first text data; and
    performing, by the first device and using the FST, ASR processing on the first audio data to generate first ASR output data,
    wherein the first device processes the first ASR output data, using the first NLU exact match rule, to determine first spoken input indicates the first NER entity.

3. The computer-implemented method of claim 1, further comprising:
    receiving a second NLU exact match rule corresponding to at least a second NER entity missing from the first data,
    wherein the first device further uses the second NLU exact match rule to determine the first spoken input indicates the first NER entity.

4. The computer-implemented method of claim 1, further comprising:
    receiving second audio data corresponding to a second spoken input;
    determining, by the first device, that second spoken input requests different content be presented on the display;
    determining, in the first data:
        a second image, and
        second text data associated with the second image, the second text data corresponding to a second NER entity;
    determining a second location wherein the second image is to be presented in the list on the first display;
    generating, by the first device, a second NLU exact match rule by:
        populating the first portion using the second text data, and
        populating the second portion using data corresponding to the second location on the display; and
    after generating the second NLU exact match rule, presenting the second image on the first display.

5. A computer-implemented method performed by a first device, comprising:
    receiving first data corresponding to a first operational context of a first device;
    receiving first display location data corresponding to a representation of an entity on a display of the first device while the first device is operating in the first operational context;
    configuring a natural language processing component based at least in part on the first data and first display location data, wherein the natural language processing component is configured for use by the first device to perform processing in response to receiving at least one natural language input while the first operational context is occurring;
    after configuring the natural language processing component, receiving second data corresponding to a first natural language input;
    using the natural language processing component to determine, by the first device, that the first natural language input corresponds to the entity; and
    performing an action responsive to the first natural language input, wherein the action corresponds to the entity.

6. The computer-implemented method of claim 5, wherein configuring the natural language processing component comprises configuring language model data to be used to determine when a natural language input indicates an entity corresponding to the first operational context.

7. The computer-implemented method of claim 5, wherein configuring the natural language processing component comprises generating language model data corresponding to content to be presented on a display associated with the first device.

8. The computer-implemented method of claim 5, further comprising:
    generating, by the first device, a finite state transducer (FST) for use in automatic speech recognition (ASR)

processing, the FST comprising a first node corresponding to the first operational context.

9. The computer-implemented method of claim 5, further comprising:
configuring the natural language processing component corresponding to at least a first entity missing from the first data,
wherein the first device further configures the natural language processing component to determine the first natural language input corresponds to the first operational context.

10. The computer-implemented method of claim 5, further comprising at least one of:
configuring acoustic model data to be used by the first device to perform a first portion of automatic speech recognition (ASR) processing in response to the at least one natural language input received while the first operational context is occurring; or
configuring language model data to be used by the first device to perform a second portion of ASR processing in response to the at least one natural language input received while the first operational context is occurring.

11. The computer-implemented method of claim 5, wherein configuring the natural language processing component comprises:
determining a first NLU exact match rule template comprising:
a first portion capable of being populated with entity information, and
a second portion capable of being populated with display location information representing a location on a display where the entity information is to be presented;
populating the first portion with first text corresponding to a first entity corresponding to the first operational context; and
populating the second portion with first display location information representing a first location where the first entity is to be presented.

12. The computer-implemented method of claim 5, further comprising:
sending the second data to a first system configured to perform SLU processing on the first data; and
based at least in part on the first natural language input corresponding to the first operational context, sending, to the first system, a command to cease processing with respect to the first natural language input.

13. A system comprising:
at least one processor; and
at least one memory comprising instructions that, when executed by the at least one processor, cause the system to:
receive first data corresponding to a first operational context of a first device;
receive first display location data corresponding to a representation of an entity on a display of the first device while the first device is operating in the first operational context;
configure a natural language processing component based at least in part on the first data and first display location data, wherein the natural language processing component is configured for use by the first device to perform processing in response receiving to at least one natural language input while the first operational context is occurring;
after configuring the natural language processing component, receive second data corresponding to a first natural language input;
using the natural language processing component to determine, by the first device, that the first natural language input corresponds to the entity; and
perform an action responsive to the first natural language input, wherein the action corresponds to the entity.

14. The system of claim 13, wherein the instructions for configuring the natural language processing component further comprise instructions that, when executed by the at least one processor, further cause the system to configure language model data to be used to determine when a natural language input indicates an entity corresponding to the first operational context.

15. The system of claim 13, wherein the instructions for configuring the natural language processing component further comprise instructions that, when executed by the at least one processor, further cause the system to generate language model data corresponding to content to be presented on a display associated with the first device.

16. The system of claim 13, wherein the at least one memory further comprises instructions that, when executed by the at least one processor, further cause the system to:
generate, by the first device, a finite state transducer (FST) for use in automatic speech recognition (ASR) processing, the FST comprising a first node corresponding to the first operational context.

17. The system of claim 13, wherein the at least one memory further comprises instructions that, when executed by the at least one processor, further cause the system to:
configuring the natural language processing component corresponding to at least a first entity missing from the first data,
wherein the first device further configures the natural language processing component to determine the first natural language input corresponds to the first operational context.

18. The system of claim 13, wherein the at least one memory further comprises instructions that, when executed by the at least one processor, further cause the system to perform at least one of:
configure acoustic model data to be used by the first device to perform a first portion of automatic speech recognition (ASR) processing in response to the at least one natural language input received while the first operational context is occurring; or
configure language model data to be used by the first device to perform a second portion of ASR processing in response to the at least one natural language input received while the first operational context is occurring.

19. The system of claim 13, wherein the instructions for configuring the natural language processing component further comprise instructions that, when executed by the at least one processor, further cause the system to:
determine a first NLU exact match rule template comprising:
a first portion capable of being populated with entity information, and
a second portion capable of being populated with display location information representing a location on a display where the entity information is to be presented;
populate the first portion with first text corresponding to a first entity corresponding to the first operational context; and populate the second portion with first display location information representing a first location where the first entity is to be presented.

20. The system of claim 13, wherein the at least one memory further comprises instructions that, when executed by the at least one processor, further cause the system to:

send the second data to a first system configured to perform SLU processing on the first data; and based at least in part on the first natural language input corresponding to the first operational context, sending, to the first system, a command to cease processing with respect to the first natural language input.

* * * * *